US012200381B2

(12) United States Patent
Suzuki et al.

(10) Patent No.: US 12,200,381 B2
(45) Date of Patent: Jan. 14, 2025

(54) SOLID-STATE IMAGING DEVICE

(71) Applicant: SONY SEMICONDUCTOR SOLUTIONS CORPORATION, Kanagawa (JP)

(72) Inventors: Dai Suzuki, Kanagawa (JP); Masao Tanaka, Kanagawa (JP); Koji Enoki, Kanagawa (JP)

(73) Assignee: SONY SEMICONDUCTOR SOLUTIONS CORPORATION, Kanagawa (JP)

(*) Notice: Subject to any disclaimer, the term of this patent is extended or adjusted under 35 U.S.C. 154(b) by 148 days.

(21) Appl. No.: 17/758,080

(22) PCT Filed: Dec. 3, 2020

(86) PCT No.: PCT/JP2020/045049
 § 371 (c)(1),
 (2) Date: Jun. 28, 2022

(87) PCT Pub. No.: WO2021/140795
 PCT Pub. Date: Jul. 15, 2021

(65) Prior Publication Data
 US 2023/0034032 A1    Feb. 2, 2023

(30) Foreign Application Priority Data
 Jan. 6, 2020 (JP) .................. 2020-000489

(51) Int. Cl.
 H04N 25/75     (2023.01)
 H04N 25/44     (2023.01)
(52) U.S. Cl.
 CPC ............ H04N 25/75 (2023.01); H04N 25/44 (2023.01)

(58) Field of Classification Search
 CPC ......... H01L 27/14636; H01L 27/14634; H01L 27/14609; H01L 27/14643; H01L 27/14601; H04N 5/37455; H04N 5/367
 See application file for complete search history.

(56) References Cited

U.S. PATENT DOCUMENTS

| 5,550,936 A | 8/1996 | Someya et al. |
| 2012/0120289 A1 | 5/2012 | Sugioka et al. |
| (Continued) | | |

FOREIGN PATENT DOCUMENTS

| CN | 102469277 A | 5/2012 |
| EP | 529903 A2 | 3/1993 |
| (Continued) | | |

OTHER PUBLICATIONS

International Search Report and Written Opinion of PCT Application No. PCT/JP2020/045049, issued on Feb. 16, 2021, 09 pages of ISRWO.

Primary Examiner — Xi Wang
(74) Attorney, Agent, or Firm — CHIP LAW GROUP

(57) ABSTRACT

Image deterioration in an image sensor is inhibited. A solid-state imaging device includes: a pixel array that photoelectrically converts received light and contains pixels arranged in a two-dimensionally arrayed manner, the pixels outputting analog signals; a conversion part that converts the analog signals outputted from the pixels to digital data; a coding part that generates one sign bit or a plurality of sign bits as to the digital data; a storage part that stores the digital data and the sign bit or sign bits; a decoding part that decodes the sign bit or sign bits as to the digital data stored in the storage part; a determination part that determines, on the basis of the decoded sign bit or sign bits, whether or not an error in writing or reading of the digital data in or from the storage part has occurred; and a signal processing part (Continued)

that processes the digital data read from the storage part on the basis of output of the determination part.

17 Claims, 14 Drawing Sheets

(56) References Cited

U.S. PATENT DOCUMENTS

| | | | |
|---|---|---|---|
| 2013/0068929 A1* | 3/2013 | Solhusvik | G06T 5/80 |
| | | | 250/208.1 |
| 2015/0138415 A1* | 5/2015 | Ono | H04N 25/772 |
| | | | 348/308 |
| 2019/0253651 A1 | 8/2019 | Shida | |
| 2021/0134873 A1* | 5/2021 | Kwon | H01L 27/14643 |

FOREIGN PATENT DOCUMENTS

| | | |
|---|---|---|
| EP | 2640055 A1 | 9/2013 |
| JP | 05-068240 A | 3/1993 |
| JP | 2007-074471 A | 3/2007 |
| JP | 2012-120158 A | 6/2012 |
| JP | 2015-100092 A | 5/2015 |
| JP | 2018-074445 A | 5/2018 |
| JP | 2018-085664 A | 5/2018 |

\* cited by examiner

SOLID-STATE IMAGING DEVICE

CROSS REFERENCE TO RELATED APPLICATIONS

This application is a U.S. National Phase of International Patent Application No. PCT/JP2020/045049 filed on Dec. 3, 2020, which claims priority benefit of Japanese Patent Application No. JP 2020-000489 filed in the Japan Patent Office on Jan. 6, 2020. Each of the above-referenced applications is hereby incorporated herein by reference in its entirety.

TECHNICAL FIELD

The present disclosure relates to a solid-state imaging device.

BACKGROUND ART

On an image sensor, photo diodes (PDs) are two-dimensionally arranged, beams of light received by these PDs are photoelectrically converted, and further, charge amounts thereof are converted to digital values, thereby outputting digital image data. In a column AD type image sensor which includes dedicated analog to digital converters (ADCs) for each row or each column which is constituted of a plurality of pixels, output processing of digital data is executed, for example, for each row, and this is referred to as rolling shutter. Since in the image sensor in which imaging processing is performed by the rolling shutter, periods of time in which reading is performed in the sensor vary from row to row, an image outputted when a dynamic body is imaged may be distorted due to rolling shutter distortion. In order to inhibit this distortion, it is desirable that AD conversion is performed at high speed.

In a case where speed-up of the AD conversion of the image sensor is made, a disadvantage in that it is required to increase throughput of a circuit which executes signal processing in a subsequent stage is brought about. When in order to cope with this, the throughput of the signal processing circuit is increased, new problems such as an increase in power consumption of a chip and an increase in a circuit area are caused. In order to solve these problems, a technique in which after the AD conversion in the image sensor, output values are stored in a memory in the sensor has been implemented. Thus, the speed-up of the AD conversion and a reduction in the throughput of the signal processing circuit are realized.

CITATION LIST

Patent Document

Patent Document 1: Japanese Patent Application Laid-Open No. 2018-085664

SUMMARY OF THE INVENTION

Problems to be Solved by the Invention

However, in a case of the image sensor having the memory built therein, since image data is once stored in the memory and thereafter, reading is performed, if at timing of reading or writing from or in the memory, an error has occurred, it is likely that values of an output image are erroneous. Although there is a technique in which influence of the error is reduced by providing correction codes and imparting error resistance, there is a problem in that costs of the circuit are increased with an increase in correction intensity.

Therefore, in the present disclosure, a solid-state imaging device which inhibits image deterioration in an image sensor having a memory built therein is provided.

Solutions to Problems

According to one embodiment, a solid-state imaging device includes: a pixel array that photoelectrically converts received light and contains pixels arranged in a two-dimensionally arrayed manner, the pixels outputting analog signals; a conversion part that converts the analog signals outputted from the pixels to digital data; a coding part that generates one sign bit or a plurality of sign bits as to the digital data; a storage part that stores the digital data and the sign bit or sign bits; a decoding part that decodes the sign bit or sign bits as to the digital data stored in the storage part; a determination part that determines, on the basis of the decoded sign bit or sign bits, whether or not an error in writing or reading of the digital data in or from the storage part has occurred; and a signal processing part that processes the digital data read from the storage part on the basis of output of the determination part.

The sign bit or sign bits may be an error detection code or error detection codes or may be an error correction code or error correction code. By making the sign bit or sign bits the error correction code or error correction codes, it can also be determined by simplified processing whether or not correction can be made.

The determination part may further determine whether or not, in writing or reading in or from the storage part, an error is correctable.

In a case where an error has occurred and the determination part determines that the error is correctable, the signal processing part may execute error correction on the basis of the sign bit or sign bits. The signal processing part may execute the error correction. As described above, the signal processing part may execute specific signal processing other than detection.

In a case where an error has occurred and the determination part determines that the error is not correctable, the signal processing part may execute detection of a defect in the storage part or the pixels. As described above, in a case where the error is not correctable by an error correction code, at timing of writing to the memory, timing of storing, or timing other than timing of reading, the signal processing part may determine that the error has occurred.

In a case where the error has occurred and the determination part determines that the error is not correctable, the signal processing part may execute correction of the digital data in which the error has been detected. As described above, in the case where the error is not correctable by the error correction code, the signal processing part may execute interpolation or defect correction processing.

The determination part may provide error information for the digital data and may transmit the digital data to the signal processing part. As described above, the determination part may output the digital data together with the error information.

The error information may include information which determines whether or not an error has occurred. For example, in a case where the sign bit or sign bits is or are an error detection code or error detection codes, the error information may be information pertinent to whether or not there is an error.

In addition, the error information may include information which determines whether or not an error is correctable. For example, in a case where the sign bit or sign bits is or are an error correction code or error correction codes and there is an error, the error information may be information which determines whether or not the error is correctable.

In a case where an image of a plurality of frames is acquired, between the frames of the digital data as to the image, the determination part may provide the error information for the digital data and may transmit the digital data to the signal processing part. In the transmission of the data to the signal processing part, as described above, the error information may be stored in a blank between the frames.

The determination part may provide the error information for each packet constituting the digital data and may transmit the digital data to the signal processing part. In the transmission of the data to the signal processing part, as described above, the error information may be stored for each packet data having a predetermined length.

The determination part may provide the error information for each of pixel values based on one of or a plurality of the pixels constituting the digital data and may transmit the digital data to the signal processing part. In the transmission of the data to the signal processing part, as described above, the error information may be stored for each predetermined number of pixels.

In a case where the decoding part decodes the sign bit or sign bits and detects an error which is correctable, the decoding part may correct the error in the digital data. As described above, in a case where the error is detected by the error correction code, instead of the signal processing part, the decoding part may execute correction and may transmit, to the signal processing part, the data in which the error has been corrected. At this time, information that the error has been corrected may be further provided as error information therefor.

According to one embodiment, the solid-state imaging device may include a first substrate in which at least the pixel array is located; and a second substrate in which at least the storage part is located.

The second substrate may further include the conversion part, the coding part, the decoding part, and the determination part. As described above, the conversion part, the coding part, the storage part, the decoding part, and the determination part may be formed in the same chip. As described above, by the above-mentioned formation, without making an interface complicated, the components can operate in transmission and reception to and from the memory.

The second substrate may further include the signal processing part. Furthermore, the signal processing part may be formed in the same chip as the above-mentioned chip.

The first substrate and the second substrate may be formed in a layered manner. In other words, the solid-state imaging device may include, in a layered structure, a chip in which an image sensor including the pixel array is mounted and a chip which performs the signal processing and which includes the storage part and the like.

The solid-state imaging device may further include a third substrate in which at least the signal processing part is located. As described above, in the substrate which is different from the second substrate including the storage part and the like, the signal processing part may be provided. In this case, the transmission of the data to the signal processing part may be performed by the above-mentioned interface.

The first substrate, the second substrate, and the third substrate may be formed in a layered manner. In other words, the solid-state imaging device may have a three-stage and layered structure which includes a chip in which an image sensor including the pixel array is mounted; a chip which includes the storage part and the like and performs simple signal processing, and further, a chip including the signal processing part which performs complicated signal processing.

At least two of the substrates may be layered by a Chip on Chip (CoC) method.

At least two of the substrates may be layered by a Chip on Wafer (CoW) method.

At least two of the substrates may be layered by a Wafer on Wafer (WoW) method. As described above, in the case where the plurality of substrates is layered, layering may be formed by any method. Furthermore, connection between the layers may also be made, by employing any method among methods, for example, using vias, micro-bumps, micro-pads, and the like.

MODES FOR CARRYING OUT THE INVENTION

Figure 1:
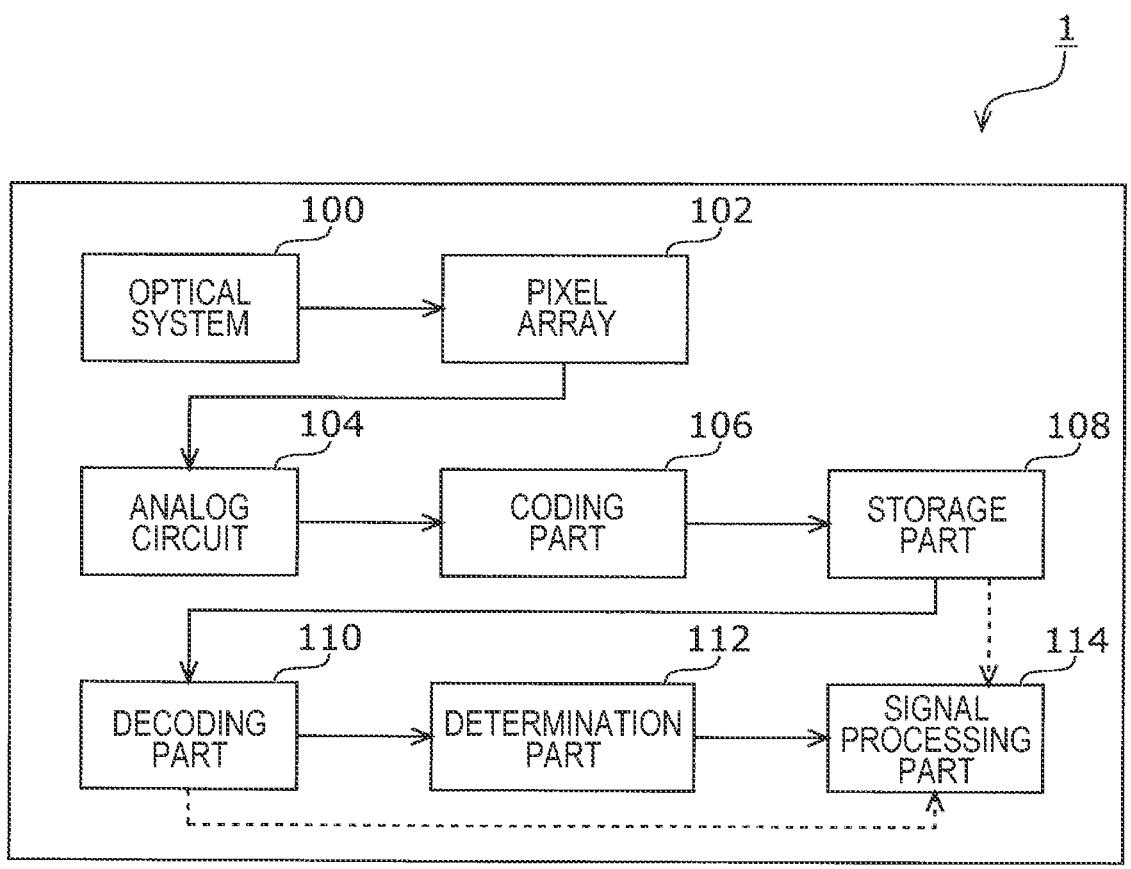
FIG. 1 is a schematic block diagram of a solid-state imaging device according to one embodiment.

Hereinafter, with reference to the accompanying drawings, a solid-state imaging device according to each of several embodiments will be described. Note that although in the drawings and the description, power source voltages Vss and Vdd or the like are not particularly mentioned, it is supposed that power source voltages are appropriately applied to circuit elements or the like.
(Solid-State Imaging Device)

FIG. 1 is a block diagram schematically depicting a solid-state imaging device 1 according to the present embodiment. The solid-state imaging device 1 includes an optical system 100, a pixel array 102, an analog circuit 104, a coding part 106, a storage part 108, a decoding part 110, a determination part 112, and a signal processing part 114.

The optical system 100 is provided, for example, above the pixel array 102 which includes pixels (light receiving elements) and is a system which corrects an optical path, aberration, and the like in order for the pixel array 102 to sense light. The optical system 100, for example, collects light received from outside on the pixels. For example, the optical system 100 includes a lens (including a virtual lens) and is appropriately installed so as to allow the light to be received on the pixel array 102.

In the pixel array 102, for example, pixels, each of which includes a PD, are arranged in a two-dimensional arrayed manner. The pixel array 102 receives light having intensity of the light received via the optical system 100 on each of the pixels, converts the light to an analog signal by photoelectric conversion, and outputs the analog signal.

The analog circuit 104 is a circuit which processes the analog signal outputted from each of the pixels of the pixel array 102. For example, the analog circuit 104 may include a conversion circuit such as an analog to digital converter (ADC) which converts the analog signal to digital data. Furthermore, the analog circuit 104 may include a digital to analog converter (DAC) which outputs a signal required upon performing AD conversion, a comparator which compares voltages of output from the DAC and the analog signal, a counter which counts output from the comparator, and an amplifier which amplifies output from the counter. As described above, the analog circuit 104 converts the analog signal to the digital data, for example, in the conversion circuit and outputs the digital data.

The coding part 106 generates a sign bit or sign bits with respect to the digital data (image data) outputted from the conversion circuit of the analog circuit 104. The sign bit or sign bits may include, for example, an error detection code or error detection codes such a parity code or parity codes and a checksum or checksums. In addition, the sign bit or sign bits may include, for example, an error correction code or error correction codes such as a hamming code or hamming codes and a cyclic code or cyclic codes. Specific examples of the sign bit or sign bits are not limited to the above-mentioned ones, and the sign bit or sign bits may include an error detection code or error detection codes or an error correction code or error correction codes, which is or are coded by other method. The coding part 106 executes coding with respect to the digital data and generates the sign bit or sign bits.

The storage part 108 includes a memory in which various kinds of data. This memory is included in, for example, one of substrates which the solid-state imaging device 1 includes. The digital data for which the coded bit or coded bits are provided by the coding part 106 is temporarily stored in this storage part 108, is subjected to appropriate signal processing, and is outputted.

The decoding part 110 acquires, from the storage part 108, the digital data for which the sign bit or sign bits are provided and decodes the digital data. For example, the digital data outputted by the coding part 106 is stored in the storage part 108, is read out by the decoding part 110 on the basis of timing at which the signal processing is executed, and is decoded. On the basis of the error detection code or error detection codes or the error correction code or error correction codes, the decoding part 110 executes error detection of the digital data. The decoding part 110 decodes code data of the digital data and outputs data pertinent to a result of the decoding. In addition, data acquired from the storage part 108 may be outputted at the same timing.

On the basis of a result of the error detection, outputted from the decoding part 110, the determination part 112 determines whether or not an error has occurred in writing or reading of the digital data to or from the storage part 108. In addition, in a case where the sign bit or sign bits are the error correction code or error correction codes, the determination part 112 determines whether or not the error is correctable. The determination part 112 outputs these determination results. In a case where the digital data is outputted from the decoding part 110, the determination part 112 may output this digital data together therewith.

The signal processing part 114 is a circuit which executes various kinds of processing with respect to the digital data converted in the analog circuit 104. For example, the signal processing part 114 converts the acquired digital data to an image format for outputting and converts the acquired digital data to data to be displayed on a display section connected to an image sensor. Besides, the signal processing part 114 may execute statistical processing and processing by a neural network, in which clustering, classification, object detection, motion detection, and the like are executed, or various kinds of image processing such as filter processing.

The coding part 106, the storage part 108, the decoding part 110, the determination part 112, and the signal processing part 114 may be formed as, for example, digital circuits which include elements performing various logical operations.

Although in FIG. 1, a flow of the data is shown by solid line arrows as one example, the present disclosure is not limited thereto. For example, the signal processing part 114 may acquire the results from the determination part 112 and may transmit and receive the data to and from the storage part 108. In other words, the signal processing part 114 may store the data processed by the signal processing part 114 in the storage part 108 again and may acquire data from the storage part 108 at timing at which the data is needed for the signal processing. In addition, the decoding part 110 may transmit error data to the determination part 112 and may directly transmit data pertinent to the digital data to the signal processing part 114. In addition, the storage part 108 may include a volatile cache memory or the like, and in this case, and transmission and reception of the data at further high speed with other components or circuits may be performed by the cache memory or the like.

Furthermore, the solid-state imaging device 1 (not depicted) includes other circuits and the like for appropriate imaging, such as an input-output interface for external inputting and outputting and a selector which selects a signal to be outputted outside via the input-output interface.

Figure 2:
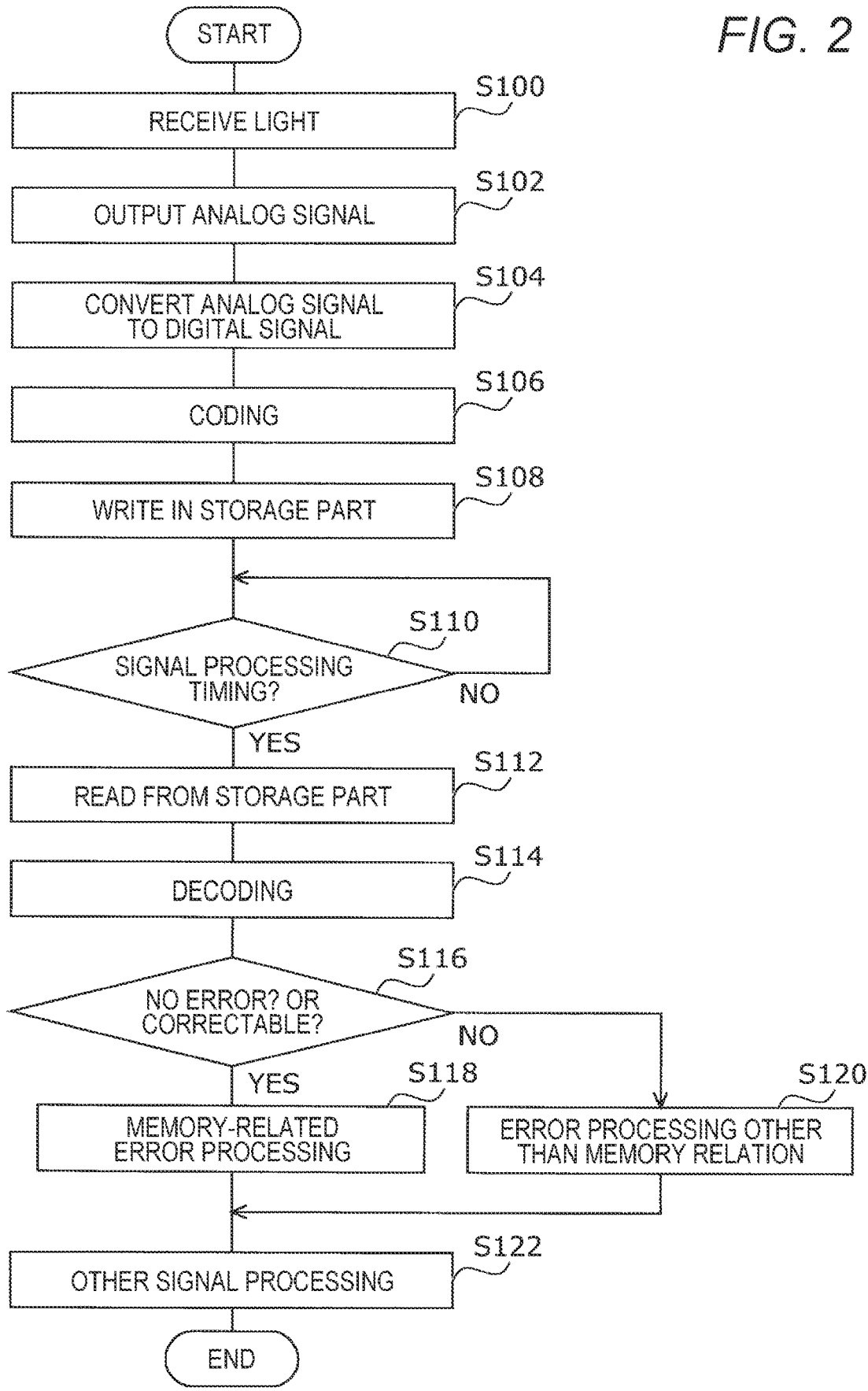
FIG. 2 is a flowchart depicting processing of the solid-state imaging device according to one embodiment.

FIG. 2 is a flowchart depicting a flow of processing performed by the solid-state imaging device 1 according to the present embodiment, with attention paid to the data. Note that in the present flowchart, it is supposed that imaging has already been started and operation to start the imaging and the like are not shown.

First, the pixel array 102 receives light from outside via the optical system 100 (S100). Subsequently, the pixel array 102 converts the received light to the analog signal by the photoelectric conversion and outputs the analog signal (S102).

Next, the analog circuit 104 which includes the conversion circuit converts the analog signal outputted from the pixel array 102 to the digital data (S104). Besides the conversion, the analog circuit 104 may appropriately execute processing needed for the analog signal processing.

Next, the coding part 106 codes the digital data outputted from the analog circuit 104 (S106). Note that the coding is a concept which embraces generating the coded bit or coded bits and providing the coded bit or coded bits for the data. As another example, the concept of the coding may embrace acquiring the error detection and the error correction codes and converting the digital data itself to data which is easily stored in the memory.

Next, the coding part 106 stores the coded digital data in the storage part 108 (S108). The stored coded digital data is read at timing which coincides with timing when the signal processing is needed. For example, in a case where processing of the signals acquired in the pixel array 102 is executed for each row of pixels, data of the row is stored in the storage part 108 until reaching to the row to be processed and is read at timing which coincides with timing when the data processing of the row is executed. Note that a unit of the processing is not limited to each row and the processing may be executed per other unit. In this case, as with the case where the processing is performed per row, the data is read at timing which coincides with timing at which each data is processed.

Next, as described above, it is determined whether or not timing is timing at which the signal processing is executed (S110). For example, in the case where the signal processing is executed per row of the pixels (S110: YES), it is determined that data of the row is at timing at which the signal processing thereof is executed and the decoding part 110 reads and acquires the data of the row from the storage part 108 (S112). The digital data to be read is coded data and is read together with, for example, the data outputted by the analog circuit 104 and coded bit or bits. In a case where the timing is not the timing at which the signal processing of the row is executed (S110: NO), a standby state is continued.

Next, the decoding part 110 decodes the sign bit or sign bits of the read digital data (S114). In a case where the digital data itself is coded, decoding together with the digital data is performed. On the basis of the decoded bit or bits, the decoding part 110 outputs error information. In the case where the digital data itself is coded, the digital data may be transmitted together with the error information.

In the above description, in a case where the error detection code or error detection codes is or are used, the error information may be, for example, data of one bit which shows whether no error has occurred or whether an error has occurred. In addition, as another example, in a case where the error correction code or error correction codes is or are used, the error information may be data of one bit which shows that no error has occurred or that an error is correctable or the error is not correctable. In addition, the error information is not limited to the data of one bit. When the data is constituted of, for example, two bits, the data may show, in the error correction code or error correction codes, four states which are a state in which no error has occurred, a state in which an error has occurred, a state in which an error is correctable, and a state in which the error is not correctable.

Next, on the basis of the error information outputted by the decoding part 110, the determination part 112 determines that the error has been detected (S116). In addition, in a case where the error correction code or error correction codes is or are used, the determination part 112 may determine whether or not the error is correctable. Then, the determination part 112 outputs these determination results. The determination part 112 may output, as the determination results, the error information which determines whether or not the error has occurred in conjunction with the digital data in which the error has occurred. In addition, the determination part 112 may output, as the determination results, the error information which determines whether or not the error is correctable in conjunction with the digital data in which the error has occurred.

In a case where the determination part 112 determines that there is no error or determines, from the error correction code or error correction codes, that the error is correctable (S116: YES), the signal processing part 114 executes processing on the basis of the code or codes (S118). For example, in a case where it is determined that in writing and reading of the memory, no error has been detected, the signal processing part 114 executes necessary processing as to the digital data acquired from the storage part 108 (or the decoding part 110 or the determination part 112) (S122). In a case where the determination part 112 determines that the error is correctable, the error in the acquired digital data is corrected on the basis of a correction code (S118) and subsequently, other signal processing is executed (S122).

Note that in a case where the error correction code or error correction codes are provided, the decoding part 110 may execute error correction. Then, the signal processing part 114 may receive, via the determination part 112 from the decoding part 110, notification that the error has occurred but has been corrected.

In a case where in step S116, the answer is YES and furthermore, it is determined that the error has occurred in the memory, the signal processing part 114 may store an address of the above-mentioned memory. In a case where in the stored address, errors have highly frequently occurred, feedback that data must not be written in the above-mentioned address may be provided for, for example, the coding part 106. By executing the processing as described above, it is made possible to inhibit the occurrence of the errors in a specific memory.

In a case where the determination part 112 determines that there is an error and the error is not correctable (S116: NO), the signal processing part 114 determines that an error which is not correctable has occurred in writing and reading to and from the memory or an error has occurred in a path other than paths of the writing and the reading to and from the memory. On the basis of this result, the signal processing part 114 may execute correction or interpolation of defective data, for example, by employing an appropriate image processing method. Then, thereafter, the appropriate signal processing is executed (S122), and the processing for the above-mentioned data is finished.

In the case where in step S116, the answer is NO, by not fixing a storage region of pixel values in, for example, the storage part 108, a defect or defects of pixels in the pixel array 102 may be detected. In other words, in a case where many errors have occurred in output signals from the same pixel, it is likely that some defect or defects have occurred in the above-mentioned pixel. In such a case, for example, the signal processing part 114 may identify a position of the above-mentioned pixel and may appropriately execute signal processing of correction or the like from pixels therearound.

In the case where there is or are the defect or the defects in the pixels, as another example, it may be determined that a pixel value or pixel values are erroneous while in step S116, the answer is YES (no error). Also in such a case, it is made possible to detect the defect or defects in the pixel or pixels, irrespective of the occurrence of the error or errors in the memory.

As described above, it may be detected by a simple configuration that an error is an error which has randomly occurred due to bit inversion or the like caused by a neutron ray in the memory or is an error which has constantly occurred in the memory or the pixel or the pixels.

As described above, according to the present embodiment, in a case where the signal processing is executed for the signals from the image sensor, even when the error which is not correctable has occurred in the memory, it is made possible for the signal processing part 114 to appropriately execute processing which reduces the error or errors, thereby allowing deterioration in image quality to be inhibited. For example, as described above, the signal processing part 114 is notified of pixel data damaged due to the error which is not correctable, thereby allowing processing such as the correction processing from pixel values therearound, which reduces the deterioration in the image quality, to be executed.

In addition, in the signal processing part, a defective pixel or defective pixels on the sensor can be dynamically detected, and as described above, by acquiring the position of the defective pixel, it is made possible to avoid erroneous detection of an error which exerts influence on the deterioration in the image quality or correction which causes the deterioration in the image quality.

In addition, also in a case where a data error is improved by a memory system single body, since for example, without increasing ECC-correctable bits or making a memory macro redundant, the processing can be executed by the signal processing part, a circuit scale can also be reduced. Furthermore, also in a case where a memory having a high error rate is incorporated into an imaging system such as a camera, influence of the deterioration in the image quality and of an increase in the circuit scale can be reduced, thereby leading to expansion of options of a memory which can be mounted on a camera, without limiting the memory to an ECC memory or the like.

(Interface)

Hereinafter, a position or positions where a sign bit or sign bits are embedded will be described by citing several examples. Transmission of the data from the determination part 112 and the like to the signal processing part 114 is executed by using the below-described interface in, for example, step S118 shown in FIG. 2. Note that several examples will be described and an aspect of the present disclosure is not limited to these aspects thereof.

Figure 3:
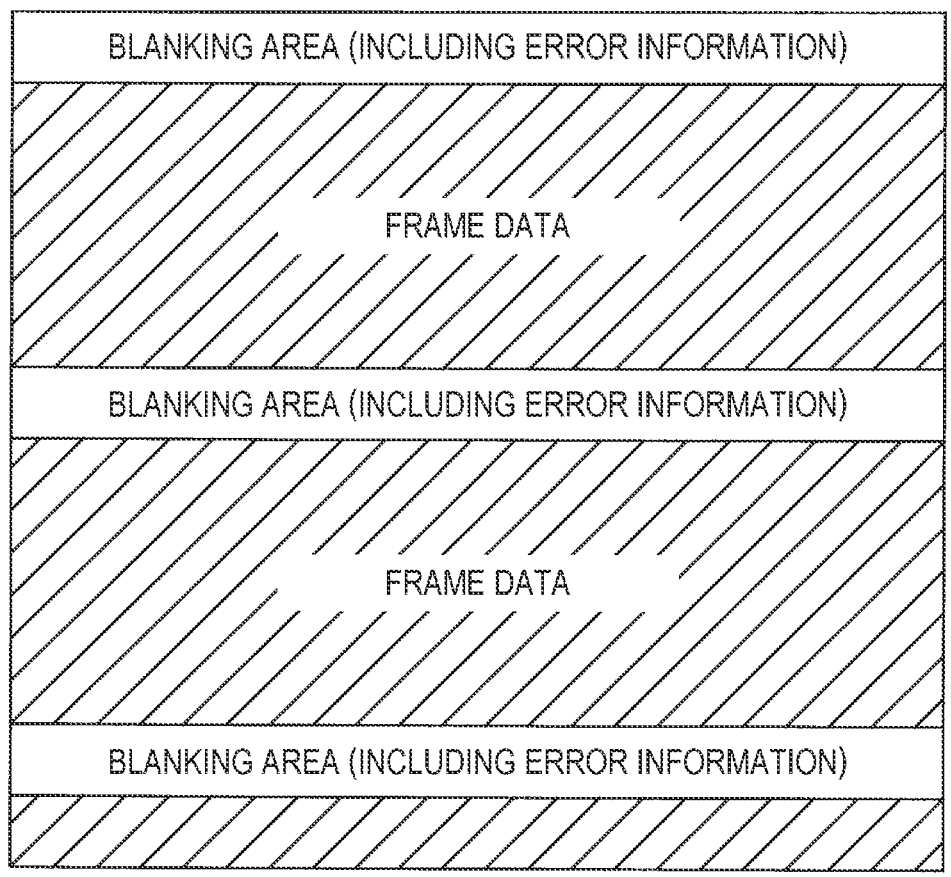
FIG. 3 is a diagram schematically depicting a storage state of digital data in a serial interface according to one embodiment.

FIG. 3 is a diagram schematically depicting a storage state of frames in a serial interface in one embodiment. The digital data of each frame is stored in the interface and is transferred. As shown in FIG. 3, the digital data includes, for example, a blanking area or a dummy pixel area between frames.

The decoding part 110 or the determination part 112 may store the error information in this blanking area or the like and may transfer the error information to the signal processing part 114. The signal processing part 114 references the error information in the acquired blanking area or the like and executes processing such as correction as to the data in the frame when the processing such as the correction in the pixel data is needed. As the error information, error information for, for example, one frame may be stored in this blanking area. Error information as to certain frame data may be stored in, for example, in a blanking area immediately before the frame data or the like or a blanking area immediately after the frame data or the like. In addition, on the basis of processing timing, the error information may be stored in a blanking area of an area which is separated by a predetermined number, instead of immediately before or after the frame data.

As described above, the area provided between the frames in the interface of the transferred data may be used, the error information may be provided thereto, and the error information may be transmitted to the signal processing part 114.

Figure 4:
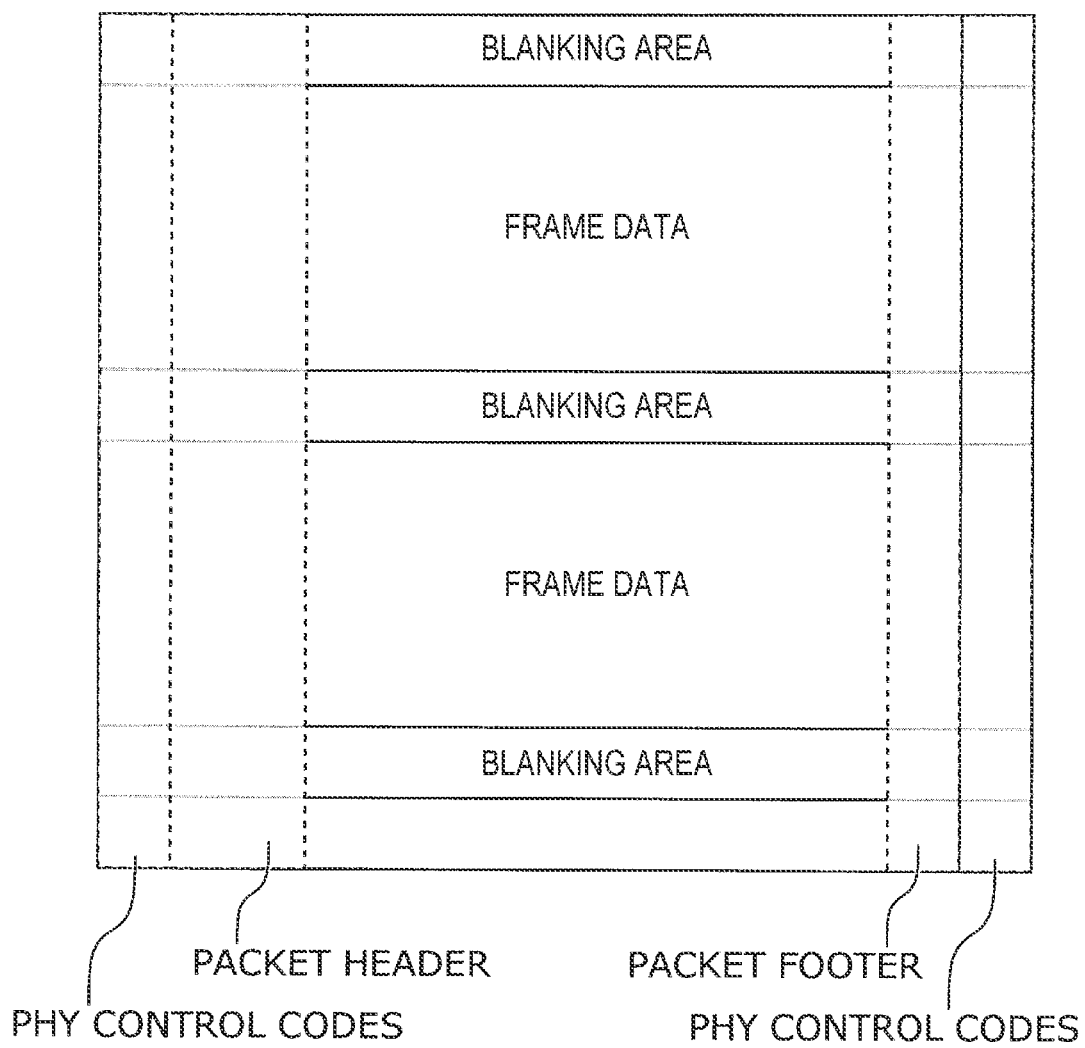
FIG. 4 is a diagram schematically depicting a storage state of the digital data in the serial interface according to one embodiment.

FIG. 4 shows an example in which the data of the serial interface according to one embodiment is stored. In a case where the data is stored in the above-described blanking area or the like, as shown in FIG. 4, control codes, a packet header, and a packet footer in physical layers may be included in each of the areas. Even in the above-described structure, similarly, the error information can be stored in the interface.

Figure 5:
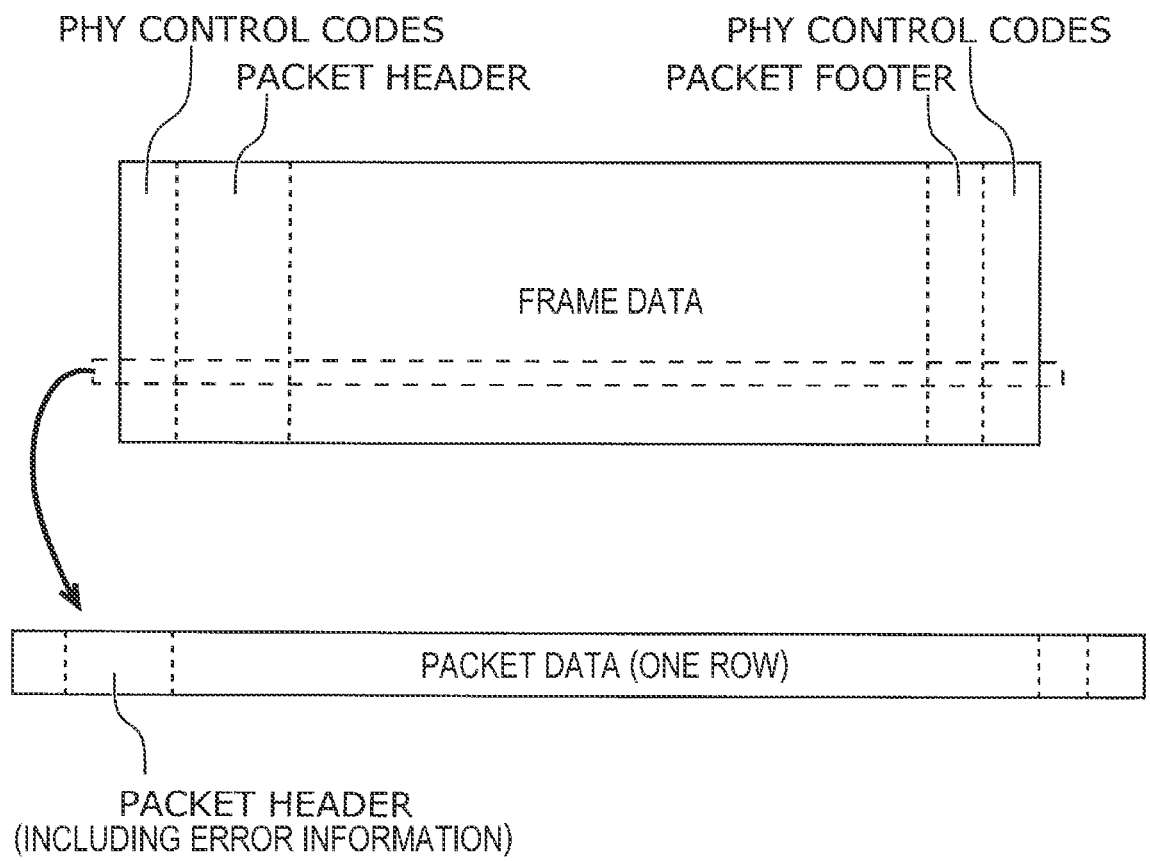
FIG. 5 is a diagram schematically depicting a storage state of the digital data in the serial interface according to one embodiment.

FIG. 5 is a diagram schematically depicting s storage state of data in a frame of the serial interface according to one embodiment. In the interface, as in FIG. 4, control codes, a packet header, and a packet footer are included. For example, in a part of this packet header, the error information may be incorporated.

A diagram shown in a lower part of FIG. 5 shows data in a certain one row, which is taken out from frame data. For example, each packet is configured in a unit of one row as shown therein. In other words, data per row of pixels in the pixel array 102 may be a unit of each of the packets. In addition, the unit of each of the packets is not limited thereto, and for example, data per any number of pixels therein may be each of the packets.

In addition, as another example of the storage state shown in FIG. 5, the error information may be included in the packet footer.

As described above, for example, the error information may be provided per packet in the pixel array 102 in the data to be transferred (pixel value data of one row).

Figure 6:
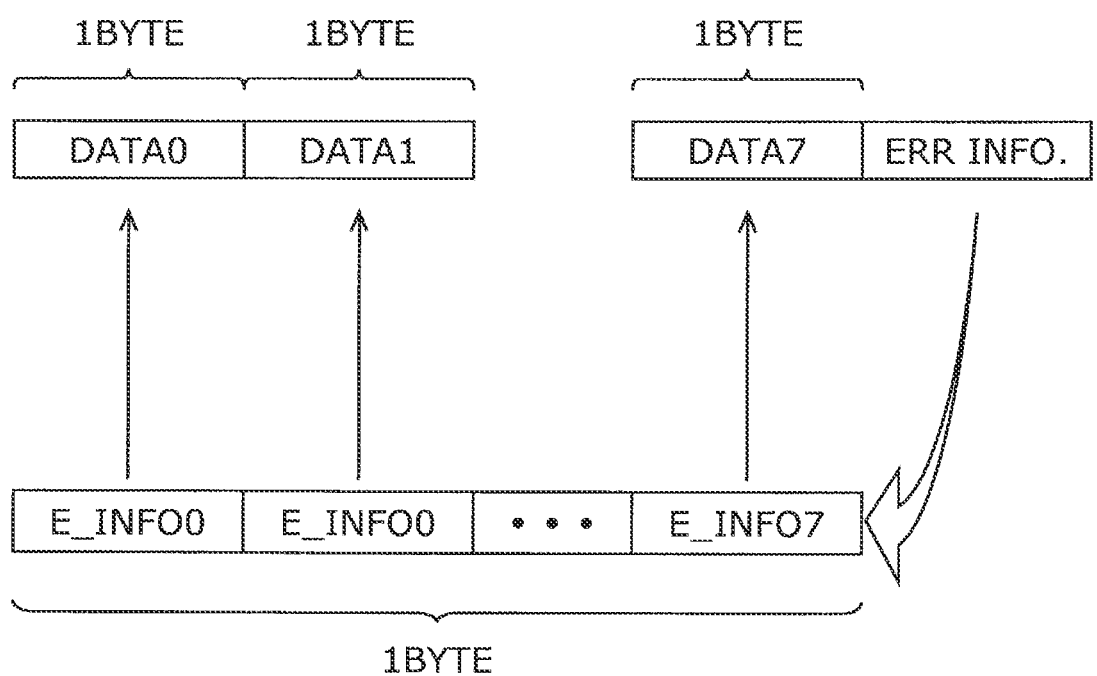
FIG. 6 is a diagram schematically depicting a storage state of the digital data in the serial interface according to one embodiment.

FIG. 6 shows further another example schematically depicting the storage state of data in the serial interface according to one embodiment. For example, in many interfaces, data is managed per Byte (eight bits). Therefore, it is preferable that the error information is also stored per Byte.

Therefore, in digital data as to pixels, when, for example, coded data of one pixel is represented by one Byte, pieces of error information of eight pixels may be collectively stored in one Byte as shown in FIG. 6. For example, in data (DATA0 and the like) of one Byte, coded pixel data including a code such as an error correction code is stored.

A diagram shown in a below row in FIG. 6 shows a bit string of the error information, which is expanded in a transverse direction. For example, in a Byte of the error information, E_INFO0 which is a bit of error information as to DATA0, E_INFO1 which is a bit of error information as to DATA1, . . . , E_INFO7 which is a bit of error information as to DATA7 are stored.

As described above, the error information may be provided per pixel value based on one or a plurality of pixels in the pixel array 102. In addition, in a case where the bits of the error information are a plurality of bits, a number of Bytes where the error information is stored may be increased to cope therewith. As another example, for example, in a case where the error information is represented by two bits, error information as to pixel data of four Bytes may be provided as one Byte.

As described above, the interface with which the data is transmitted and received can be freely selected. By using each of the above-described interfaces, the data may be transmitted and received to and from the signal processing part 114. In addition, after finishing the correction, the defect processing, and the like of an image, the signal processing part 114 may abandon this error information and transmit the error information outside. As described above, by storing, for example, the error correction code or error correction codes, without increasing the circuit scale of the signal processing part 114, the signal processing per line or the like can be appropriately executed.

(Chip Configuration)

Hereinafter, configuration examples of substrates will be described by citing several examples. Note that these are described as to the several examples and a mode of the present disclosure is not limited these aspects.

Figure 7:
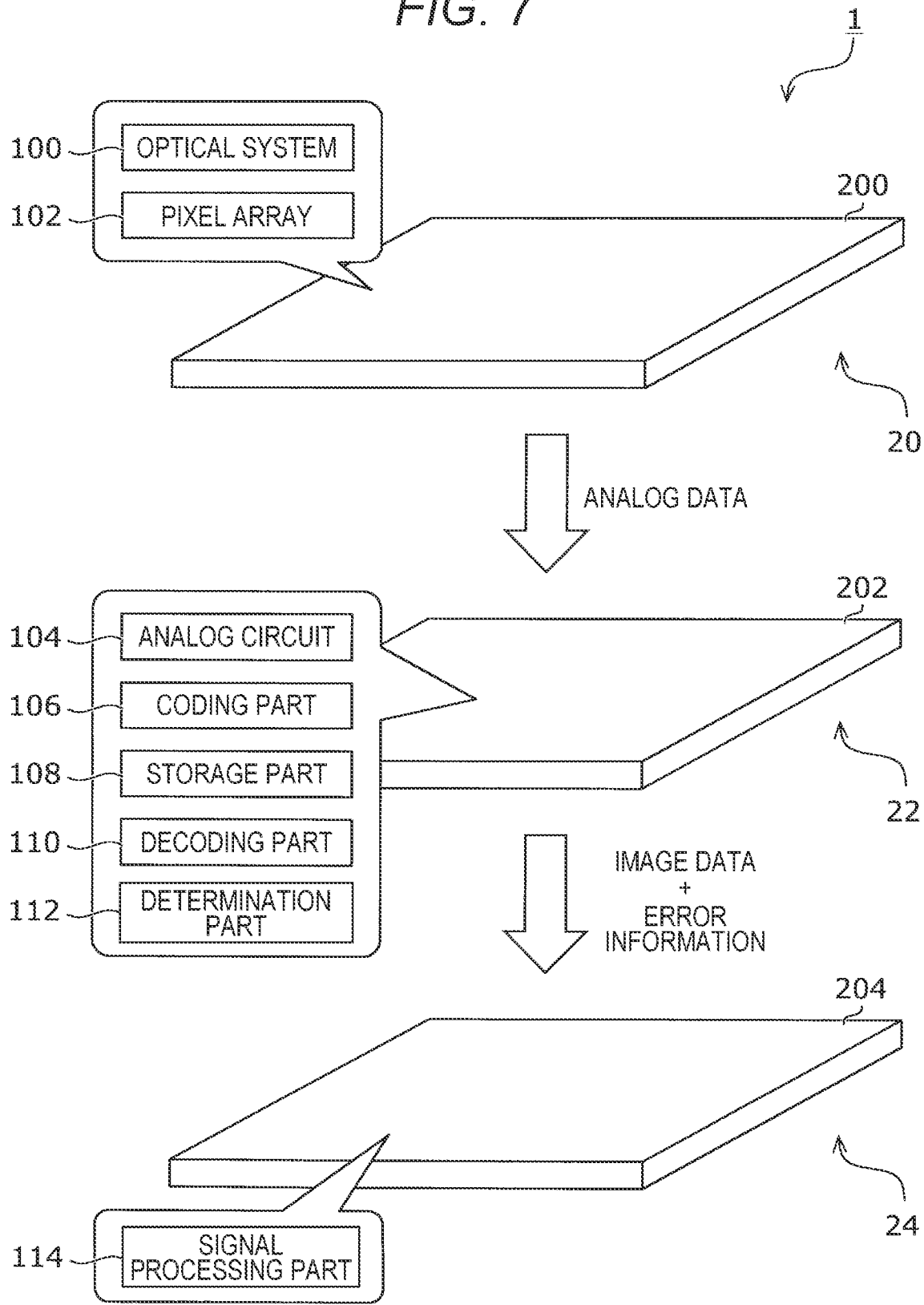
FIG. 7 is a diagram depicting a substrate configuration of the solid-state imaging device according to one embodiment.

FIG. 7 is a diagram depicting a configuration example of substrates (chips) of a solid-state imaging device 1 according to one embodiment. The solid-state imaging device 1 includes a first substrate 200, a second substrate 202, and a third substrate 204.

The first substrate 200 is included as one independent substrate 20. The first substrate 200 includes an optical system 100 and a pixel array 102. This first substrate 200 outputs analog signals outputted by a pixel array 102 to the second substrate 202. For this output, any technique may be used. Here, the pixel array 102 may be a pixel array which means only a PD light receiving part constituting pixels in particular. In other words, a component which is not the PD light receiving part of the pixels may be included in the second substrate 202 or the like, and the PD light receiving part may be included in the first substrate 200.

The second substrate 202 is included as one independent substrate 22. The second substrate 202 includes an analog circuit 104, a coding part 106, a storage part 108, a decoding part 110, and a determination part 112. This second substrate 202 acquires analog signals outputted from the first substrate 200, executes the above-described processing for the analog signals in the analog circuit 104 to the determination part 112, and outputs image data and error information to the third substrate 204. This output is executed on the basis of, for example, the above-described interface and is transmitted by any means.

The third substrate 204 is included as one independent substrate 24. The third substrate 204 includes a signal processing part 114. This third substrate 204 acquires the image data and the error information which are outputted from the second substrate 202, executes the above-described processing, and outputs the image data and the error information outside or executes needed processing such as storing the image data and the error information in the storage part 108.

As described above, the solid-state imaging device 1 may include the first substrate 200, the second substrate 202, and the third substrate 204 as respectively independent substrates.

Figure 8:
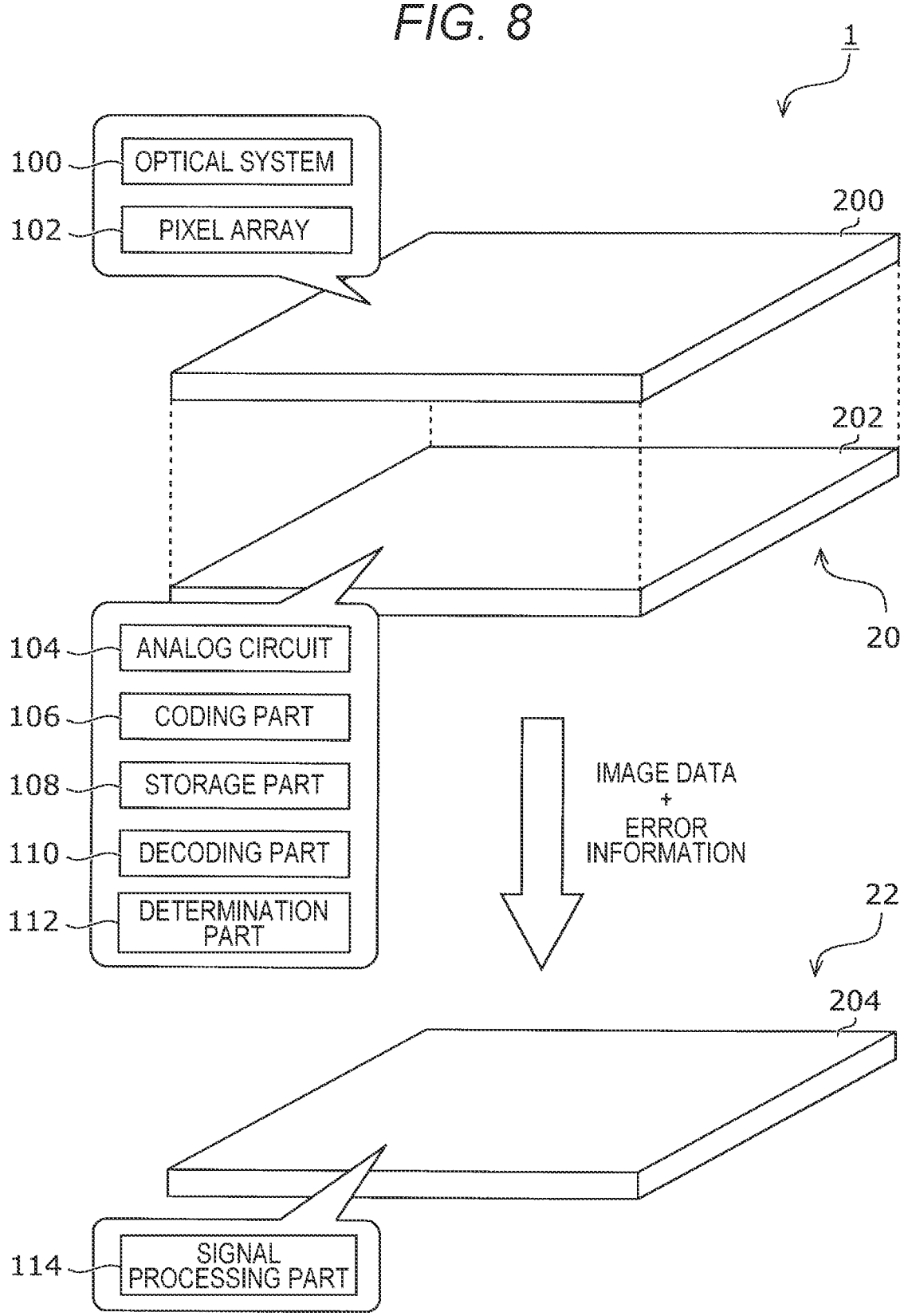
FIG. 8 is a diagram depicting a substrate configuration of the solid-state imaging device according to one embodiment.

FIG. 8 is a diagram depicting a configuration example of substrates of a solid-state imaging device 1 according to one embodiment.

A first substrate 200 and a second substrate 202 are included as a layered substrate 20.

The first substrate 200 includes an optical system 100 and a pixel array 102. This first substrate 200 outputs analog signals outputted by the pixel array 102 to an analog circuit 104 of the second substrate 202 which is connected via, for example, vias, micro-bumps, micro-pads or the like. As to the pixel array 102, as in FIG. 7, a PD light receiving part of a pixel array may be included in the first substrate 200.

The second substrate 202 includes an analog circuit 104, a coding part 106, a storage part 108, a decoding part 110, and a determination part 112. This second substrate 202 acquires analog signals outputted from the first substrate 200, executes the above-described processing for the analog signals in the analog circuit 104 to the determination part 112, and outputs image data and error information to the third substrate 204. This output is executed on the basis of, for example, the above-described interface and is transmitted by any means.

The third substrate 204 is included as one independent substrate 24. The third substrate 204 includes a signal processing part 114.

As described above, the solid-state imaging device 1 may include the first substrate 200 and the second substrate 202, which are formed as layered semiconductors, and the third substrate 204 independent from the layered substrates.

Figure 9:
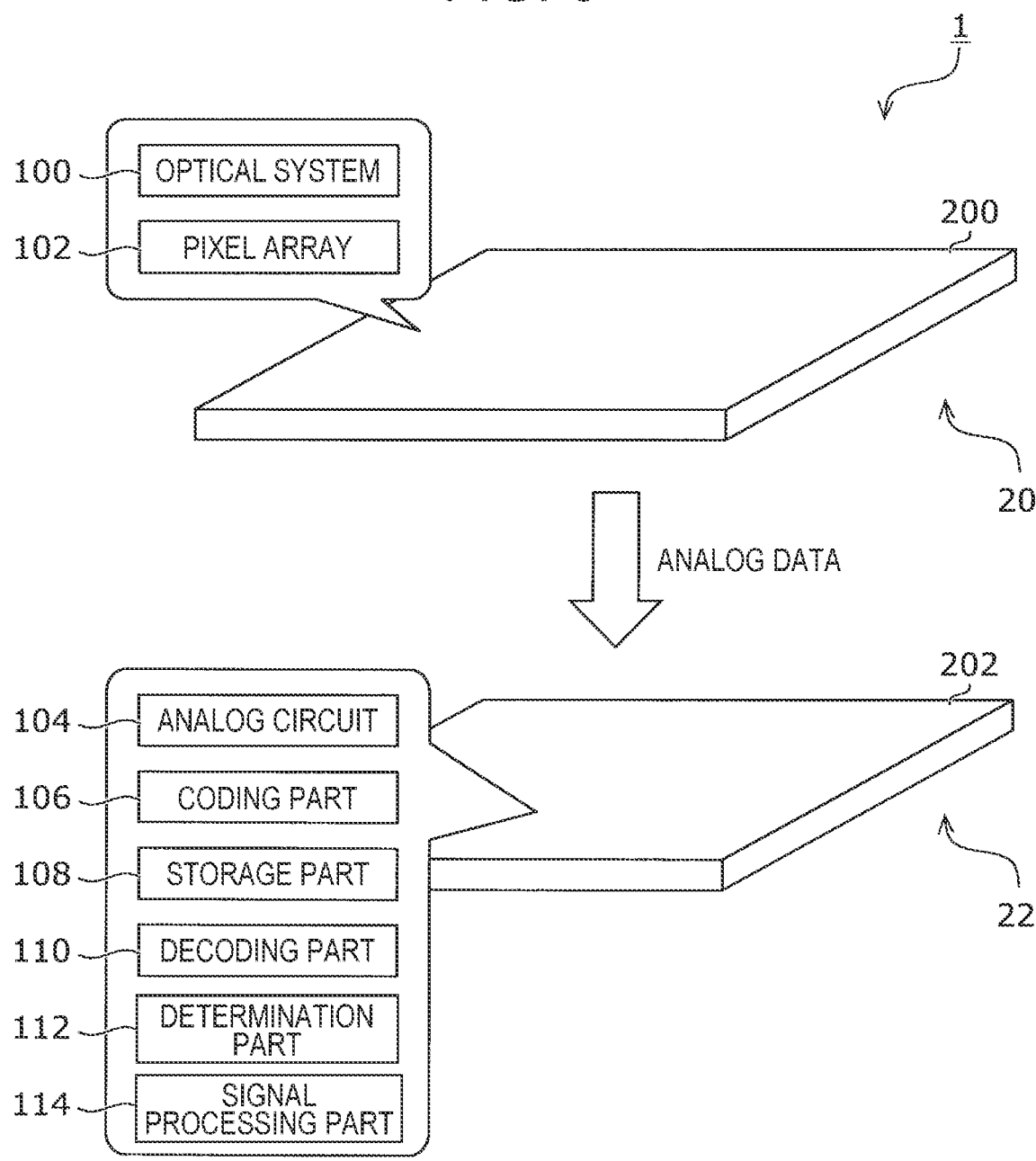
FIG. 9 is a diagram depicting a substrate configuration of the solid-state imaging device according to one embodiment.

FIG. 9 is a diagram depicting a configuration example of substrates of a solid-state imaging device 1 according to one embodiment.

A first substrate 200 is included as one independent substrate 20. The first substrate 200 includes an optical system 100 and a pixel array 102. As to the pixel array 102, as in FIG. 7, a PD light receiving part of a pixel array may be included in the first substrate 200.

A second substrate 202 is included as one independent substrate 22. The second substrate 202 includes an analog circuit 104, a coding part 106, a storage part 108, a decoding part 110, a determination part 112, and a signal processing part 114. This second substrate 202 acquires analog signals outputted from the first substrate 200 and executes the above-described processing in the analog circuit 104 to the signal processing part 114 for the analog signals.

As described above, the solid-state imaging device 1 may include the first substrate 200 and the second substrate 202 as substrates which are independent from each other.

Figure 10:
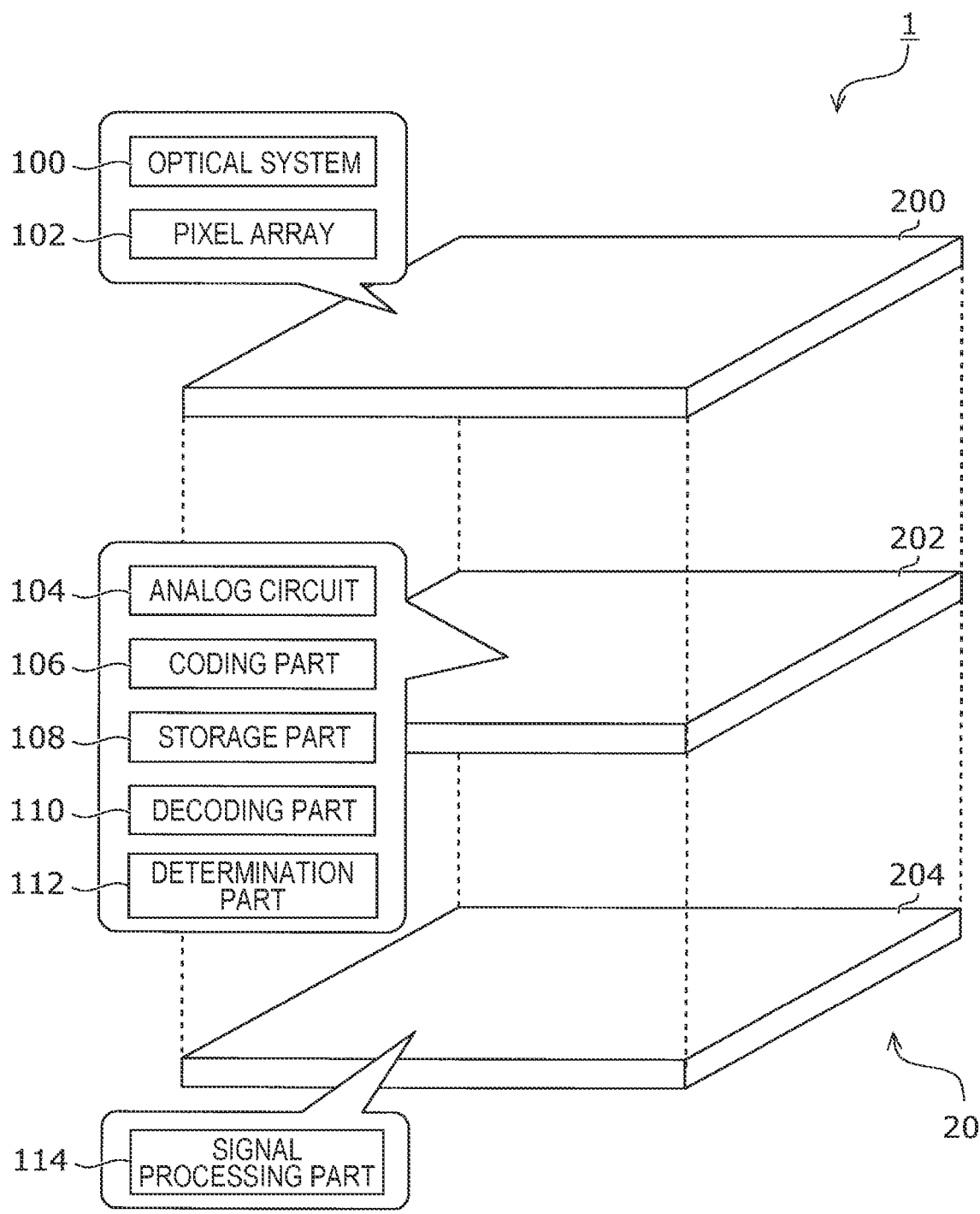
FIG. 10 is a diagram depicting a substrate configuration of the solid-state imaging device according to one embodiment.

FIG. 10 is a diagram depicting a configuration example of substrates of a solid-state imaging device 1 according to one embodiment.

A first substrate 200, a second substrate 202, and a third substrate 204 are included as a layered substrate 20.

The first substrate 200 includes an optical system 100 and a pixel array 102. This first substrate 200 outputs analog signals outputted by the pixel array 102 to an analog circuit 104 of the second substrate 202 which is connected via, for example, vias, micro-bumps, micro-pads or the like. As to the pixel array 102, as in FIG. 7, a PD light receiving part of a pixel array may be included in the first substrate 200.

The second substrate 202 includes an analog circuit 104, a coding part 106, a storage part 108, a decoding part 110, and a determination part 112. This second substrate 202 acquires analog signals outputted from the first substrate 200, executes the above-described processing in the analog circuit 104 to the determination part 112 for the analog signals, and outputs image data and error information to the third substrate 204 which is connected via, for example, vias, micro-bumps, micro-pads, or the like. This output may be executed on the basis of, for example, the above-described interface.

The third substrate 204 is included as one independent substrate 24. The third substrate 204 includes a signal processing part 114.

As described above, the solid-state imaging device 1 may include the first substrate 200, the second substrate 202, and the third substrate 204 which are formed as a layered semiconductor. By the above-described formation, a large area may be allocated for the signal processing part 114.

Figure 11:
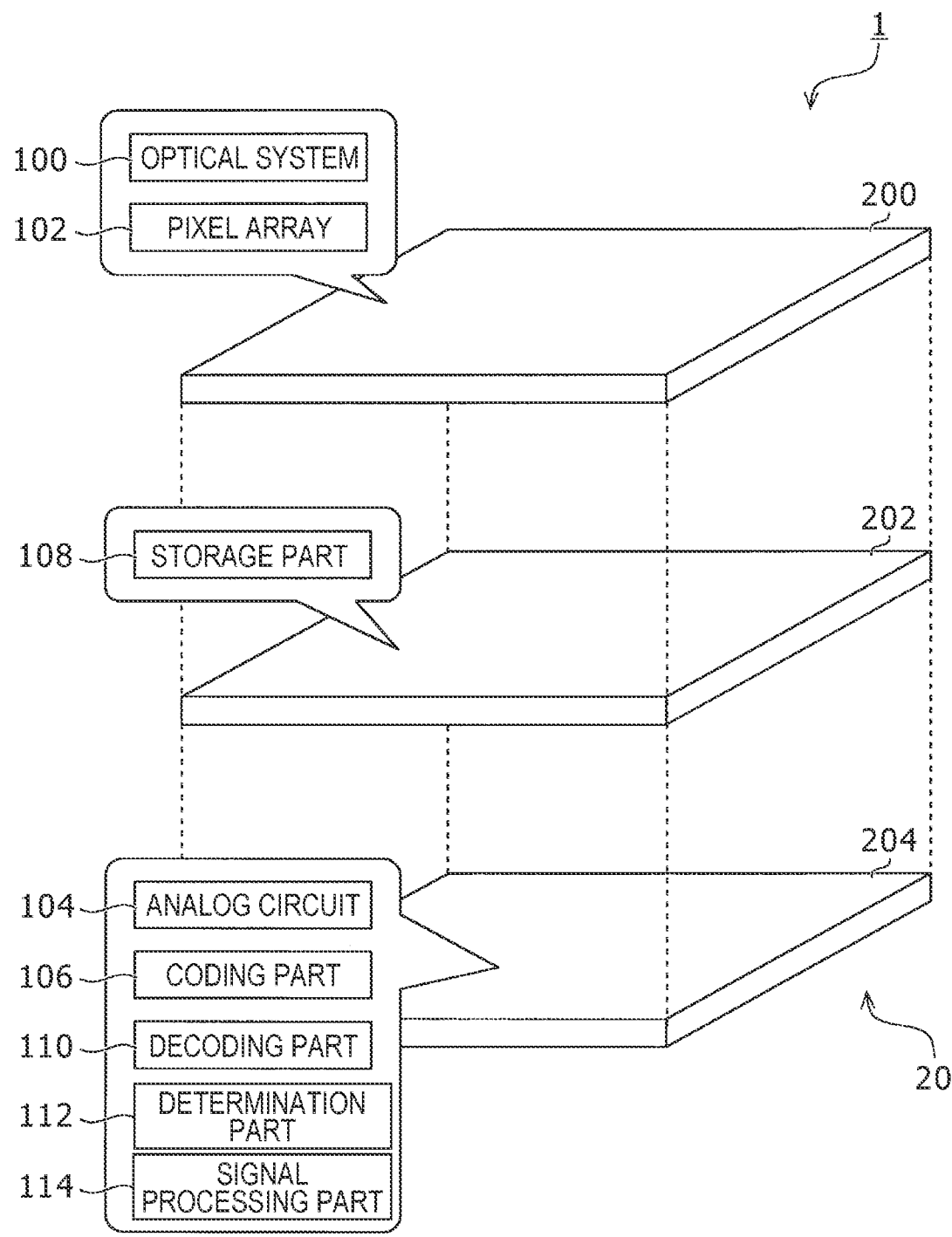
FIG. 11 is a diagram depicting a substrate configuration of the solid-state imaging device according to one embodiment.

FIG. 11 is a diagram depicting a configuration example of substrates of a solid-state imaging device 1 according to one embodiment. As in FIG. 10, three layers are formed as a layered substrate 20.

A configuration of a first substrate 200 is similar to the configuration shown in FIG. 10.

A second substrate 202 includes a storage part 108 which is formed between the first substrate 200 and a third substrate 204.

The third substrate 204 includes an analog circuit 104, a coding part 106, a decoding part 110, a determination part 112, and a signal processing part 114. At timing at which processing of signals is executed in the third substrate 204, writing or reading of data is appropriately performed to or from the storage part 108 of the second substrate 202.

As described above, the solid-state imaging device 1 may include the first substrate 200, the second substrate 202, and the third substrate 204 which are formed as a layered semiconductor. By the above-described formation, a large area may be allocated for the storage part 108.

Note that for the layered substrates, for example, the so-called Chip on Chip (CoC) method in which a wafer is cut into pieces for singulation and thereafter, the pieces are vertically stacked and bonded may be adopted. Alternatively, the so-called Chip on Wafer (CoW) method in which any one of substrates is cut from a wafer for singulation and thereafter, the singulated substrate is bonded to substrates before singulation may be adopted. Alternatively, the so-called Wafer on Wafer (WoW) method in which substrates in a wafer state are bonded may be adopted.

In addition, for bonding between substrates, a variety of bonding methods may be employed. For example, plasma bonding or the like may be employed.

In addition, as described above, for transferring of the signals among the laminated layers, a variety of connection methods such as methods using vias, micro-bumps, micro-pads, and the like may be employed.

The technology according to the present disclosure (the present technology) is applicable to a variety of products. For example, the technology according to the present disclosure may be realized as an apparatus mounted in any of kinds of moving bodies such as an automobile, an electric automobile, a hybrid electric automobile, a motorbike, a bicycle, a personal transporter, an airplane, a drone, a ship, and a robot.

Figure 12:
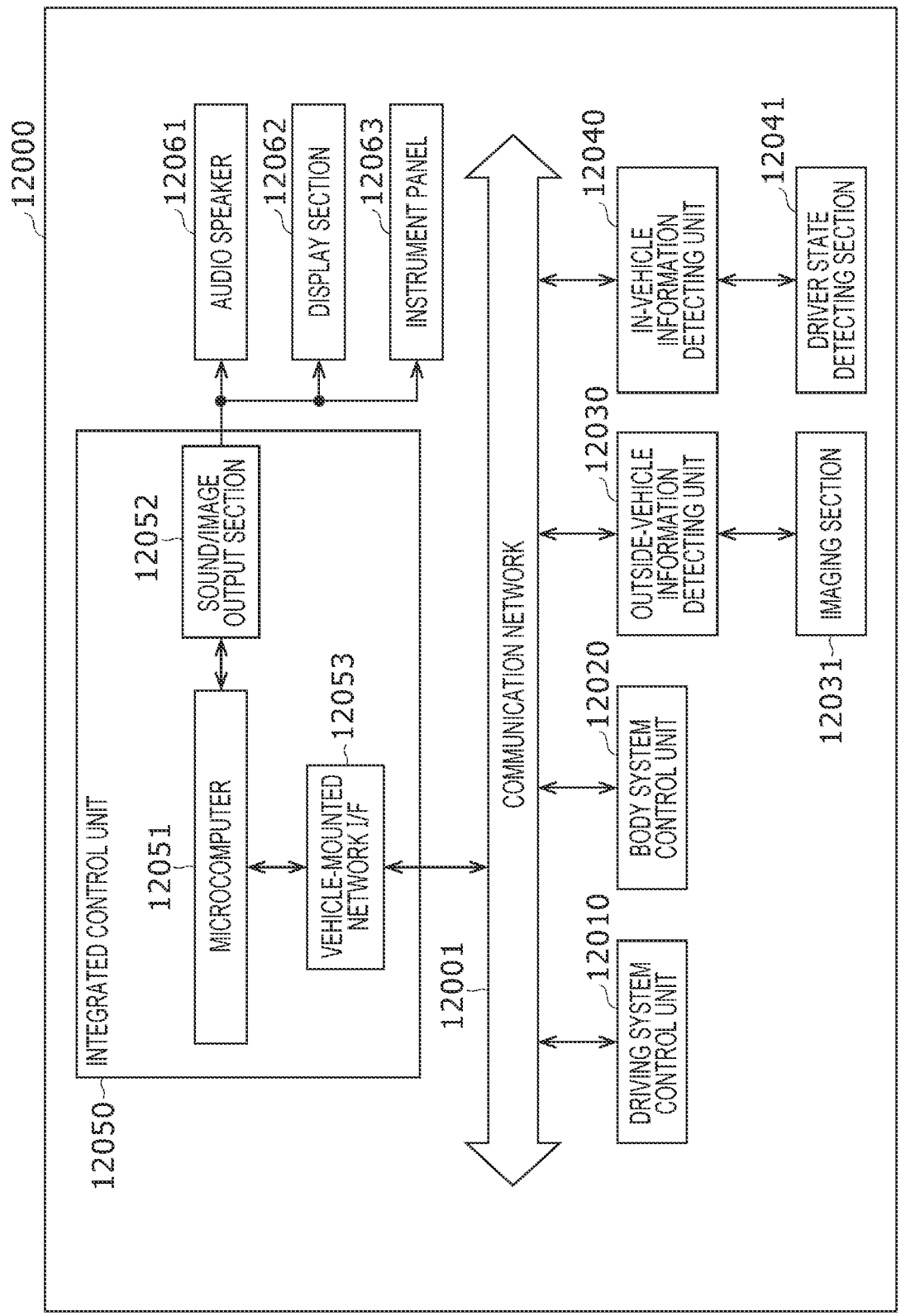
FIG. 12 is a block diagram depicting one example of a schematic configuration of a vehicle control system.

FIG. 12 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 12, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12030 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 12, an audio speaker 12061, a display section 12062, and an instrument panel 12063 are illustrated as the output device. The display section 12062 may, for example, include at least one of an on-board display and a head-up display.

Figure 13:
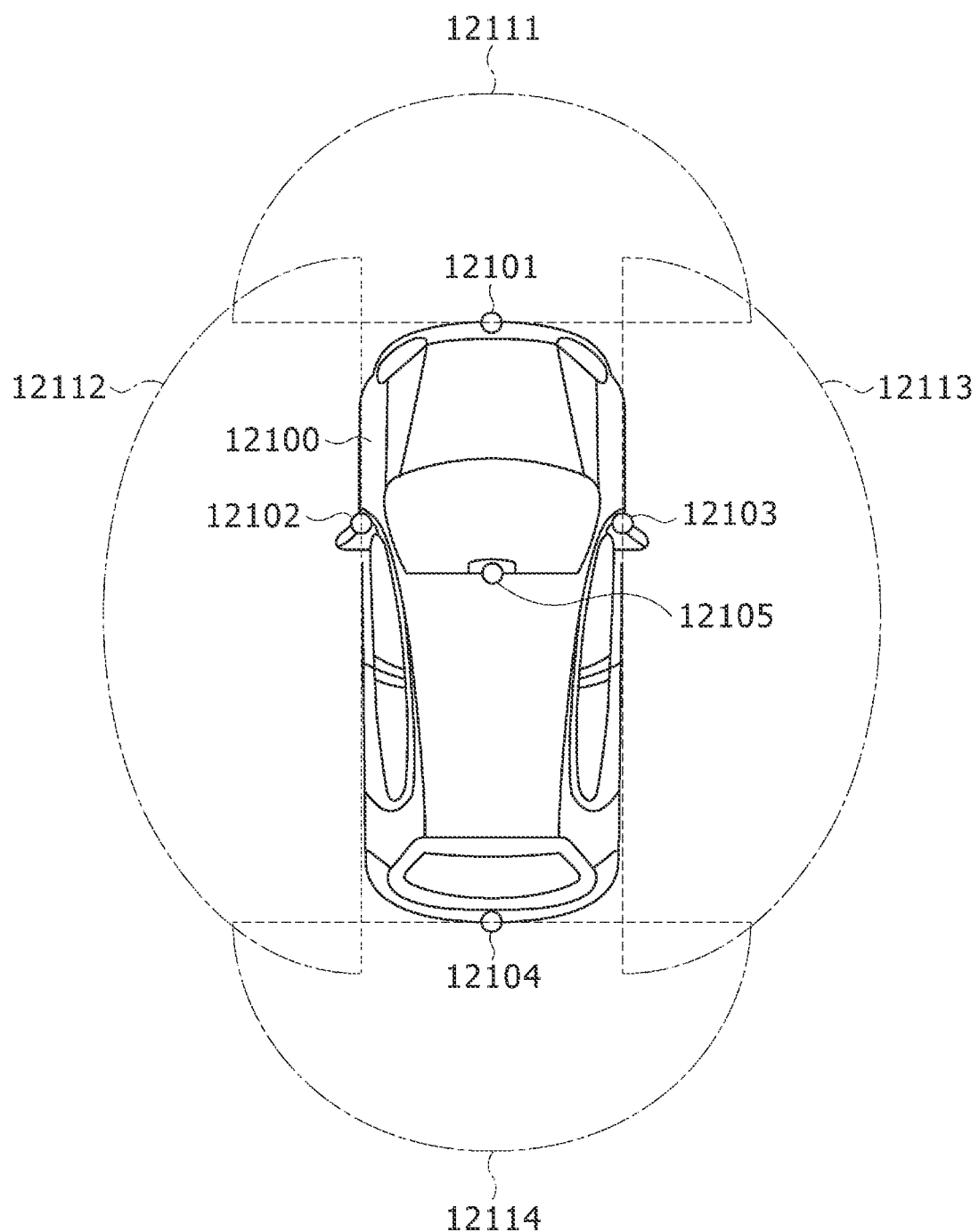
FIG. 13 is a diagram of assistance in explaining an example of installation positions of an outside-vehicle information detecting section and an imaging section.

FIG. 13 is a diagram depicting an example of the installation position of the imaging section 12031.

In FIG. 13, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 13 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Furthermore, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

Hereinbefore, one example of the vehicle control system to which the technology according to the present disclosure is applicable is described. The technology according to the present disclosure is applicable to the imaging section 12031 or the like among the above-described configurations. The technology according to the present disclosure is applied to the imaging section 12031, thereby allowing high speed reading and enabling formation of a circuit which inhibits enlargement of a signal processing circuit.

The technology according to the present disclosure (the present technology) is applicable to a variety of products. For example, the technology according to the present disclosure may be applied to an endoscopic surgery system.

Figure 14:
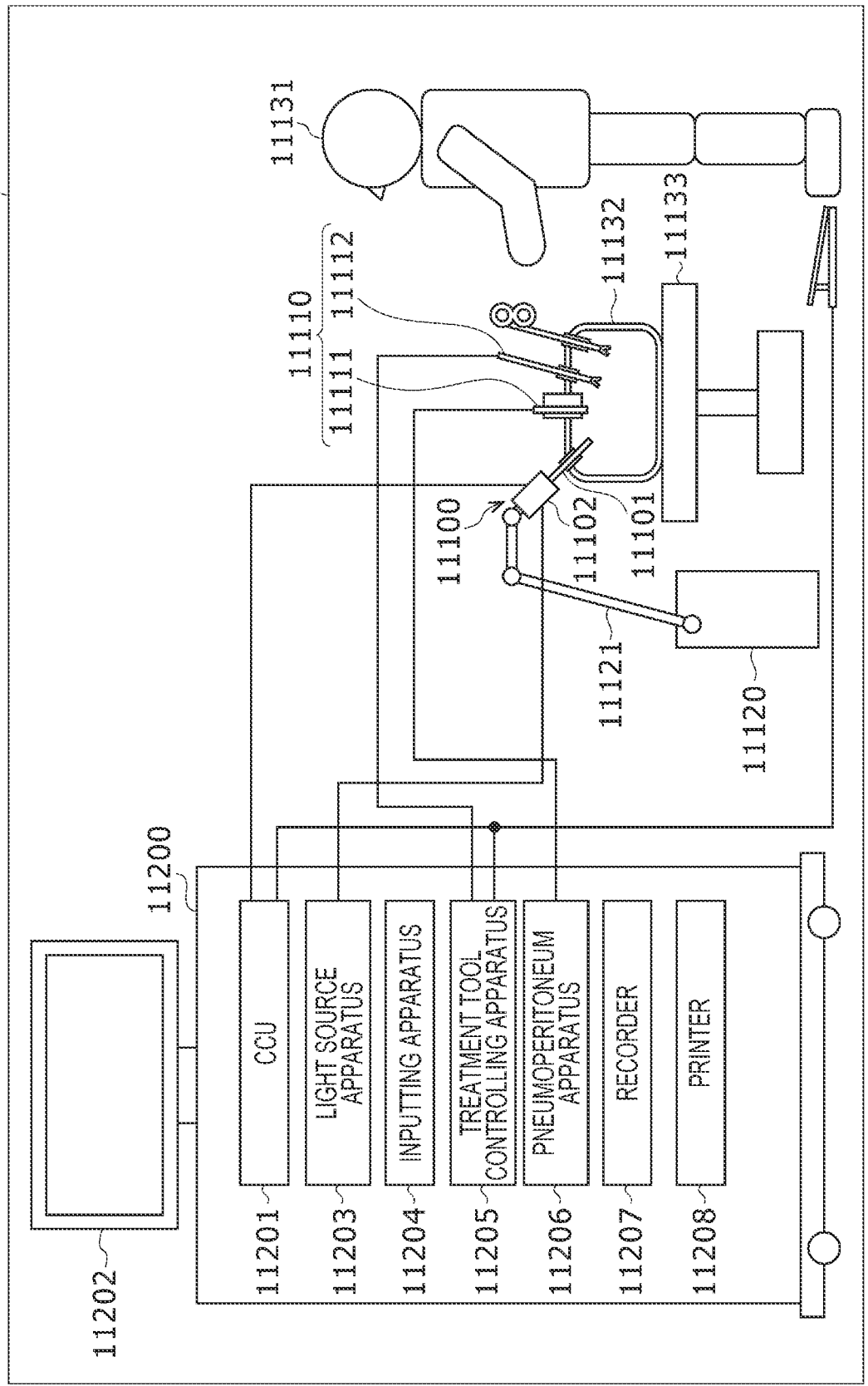
FIG. 14 is a view depicting one example of a schematic configuration of an endoscopic surgery system.

FIG. 14 is a view depicting an example of a schematic configuration of an endoscopic surgery system to which the technology according to an embodiment of the present disclosure (present technology) can be applied.

In FIG. 14, a state is illustrated in which a surgeon (medical doctor) 11131 is using an endoscopic surgery system 11000 to perform surgery for a patient 11132 on a patient bed 11133. As depicted, the endoscopic surgery system 11000 includes an endoscope 11100, other surgical tools 11110 such as a pneumoperitoneum tube 11111 and an energy device 11112, a supporting arm apparatus 11120 which supports the endoscope 11100 thereon, and a cart 11200 on which various apparatus for endoscopic surgery are mounted.

The endoscope 11100 includes a lens barrel 11101 having a region of a predetermined length from a distal end thereof to be inserted into a body cavity of the patient 11132, and a camera head 11102 connected to a proximal end of the lens barrel 11101. In the example depicted, the endoscope 11100 is depicted which includes as a rigid endoscope having the lens barrel 11101 of the hard type. However, the endoscope 11100 may otherwise be included as a flexible endoscope having the lens barrel 11101 of the flexible type.

The lens barrel 11101 has, at a distal end thereof, an opening in which an objective lens is fitted. A light source apparatus 11203 is connected to the endoscope 11100 such that light generated by the light source apparatus 11203 is introduced to a distal end of the lens barrel 11101 by a light guide extending in the inside of the lens barrel 11101 and is irradiated toward an observation target in a body cavity of the patient 11132 through the objective lens. It is to be noted that the endoscope 11100 may be a forward-viewing endoscope or may be an oblique-viewing endoscope or a side-viewing endoscope.

An optical system and an image pickup element are provided in the inside of the camera head 11102 such that reflected light (observation light) from the observation target is condensed on the image pickup element by the optical system. The observation light is photo-electrically converted by the image pickup element to generate an electric signal corresponding to the observation light, namely, an image signal corresponding to an observation image. The image signal is transmitted as RAW data to a CCU 11201.

The CCU 11201 includes a central processing unit (CPU), a graphics processing unit (GPU) or the like and integrally controls operation of the endoscope 11100 and a display apparatus 11202. Furthermore, the CCU 11201 receives an image signal from the camera head 11102 and performs, for the image signal, various image processes for displaying an image based on the image signal such as, for example, a development process (demosaic process).

The display apparatus 11202 displays thereon an image based on an image signal, for which the image processes have been performed by the CCU 11201, under the control of the CCU 11201.

The light source apparatus 11203 includes a light source such as, for example, a light emitting diode (LED) and supplies irradiation light upon imaging of a surgical region to the endoscope 11100.

An inputting apparatus 11204 is an input interface for the endoscopic surgery system 11000. A user can perform inputting of various kinds of information or instruction inputting to the endoscopic surgery system 11000 through the inputting apparatus 11204. For example, the user would input an instruction or a like to change an image pickup condition (type of irradiation light, magnification, focal distance or the like) by the endoscope 11100.

A treatment tool controlling apparatus 11205 controls driving of the energy device 11112 for cautery or incision of a tissue, sealing of a blood vessel or the like. A pneumoperitoneum apparatus 11206 feeds gas into a body cavity of the patient 11132 through the pneumoperitoneum tube 11111 to inflate the body cavity in order to secure the field of view of the endoscope 11100 and secure the working space for the surgeon. A recorder 11207 is an apparatus capable of recording various kinds of information relating to surgery. A printer 11208 is an apparatus capable of printing various kinds of information relating to surgery in various forms such as a text, an image or a graph.

It is to be noted that the light source apparatus 11203 which supplies irradiation light when a surgical region is to be imaged to the endoscope 11100 may include a white light source which includes, for example, an LED, a laser light source or a combination of them. Where a white light source includes a combination of red, green, and blue (RGB) laser light sources, since the output intensity and the output timing can be controlled with a high degree of accuracy for each color (each wavelength), adjustment of the white balance of a picked up image can be performed by the light source apparatus 11203. Furthermore, in this case, if laser beams from the respective RGB laser light sources are irradiated time-divisionally on an observation target and driving of the image pickup elements of the camera head 11102 are controlled in synchronism with the irradiation timings. Then images individually corresponding to the R, G and B colors can be also picked up time-divisionally. According to this method, a color image can be obtained even if color filters are not provided for the image pickup element.

Furthermore, the light source apparatus 11203 may be controlled such that the intensity of light to be outputted is changed for each predetermined time. By controlling driving of the image pickup element of the camera head 11102 in synchronism with the timing of the change of the intensity of light to acquire images time-divisionally and synthesizing the images, an image of a high dynamic range free from underexposed blocked up shadows and overexposed highlights can be created.

Furthermore, the light source apparatus 11203 may be configured to supply light of a predetermined wavelength band ready for special light observation. In special light observation, for example, by utilizing the wavelength dependency of absorption of light in a body tissue to irradiate light of a narrow band in comparison with irradiation light upon ordinary observation (namely, white light), narrow band observation (narrow band imaging) of imaging a predetermined tissue such as a blood vessel of a superficial portion of the mucous membrane or the like in a high contrast is performed. Alternatively, in special light observation, fluorescent observation for obtaining an image from fluorescent light generated by irradiation of excitation light may be performed. In fluorescent observation, it is possible to perform observation of fluorescent light from a body tissue by irradiating excitation light on the body tissue (autofluorescence observation) or to obtain a fluorescent light image by locally injecting a reagent such as indocyanine green (ICG) into a body tissue and irradiating excitation light corresponding to a fluorescent light wavelength of the reagent upon the body tissue. The light source apparatus 11203 can be configured to supply such narrow-band light and/or excitation light suitable for special light observation as described above.

Figure 15:
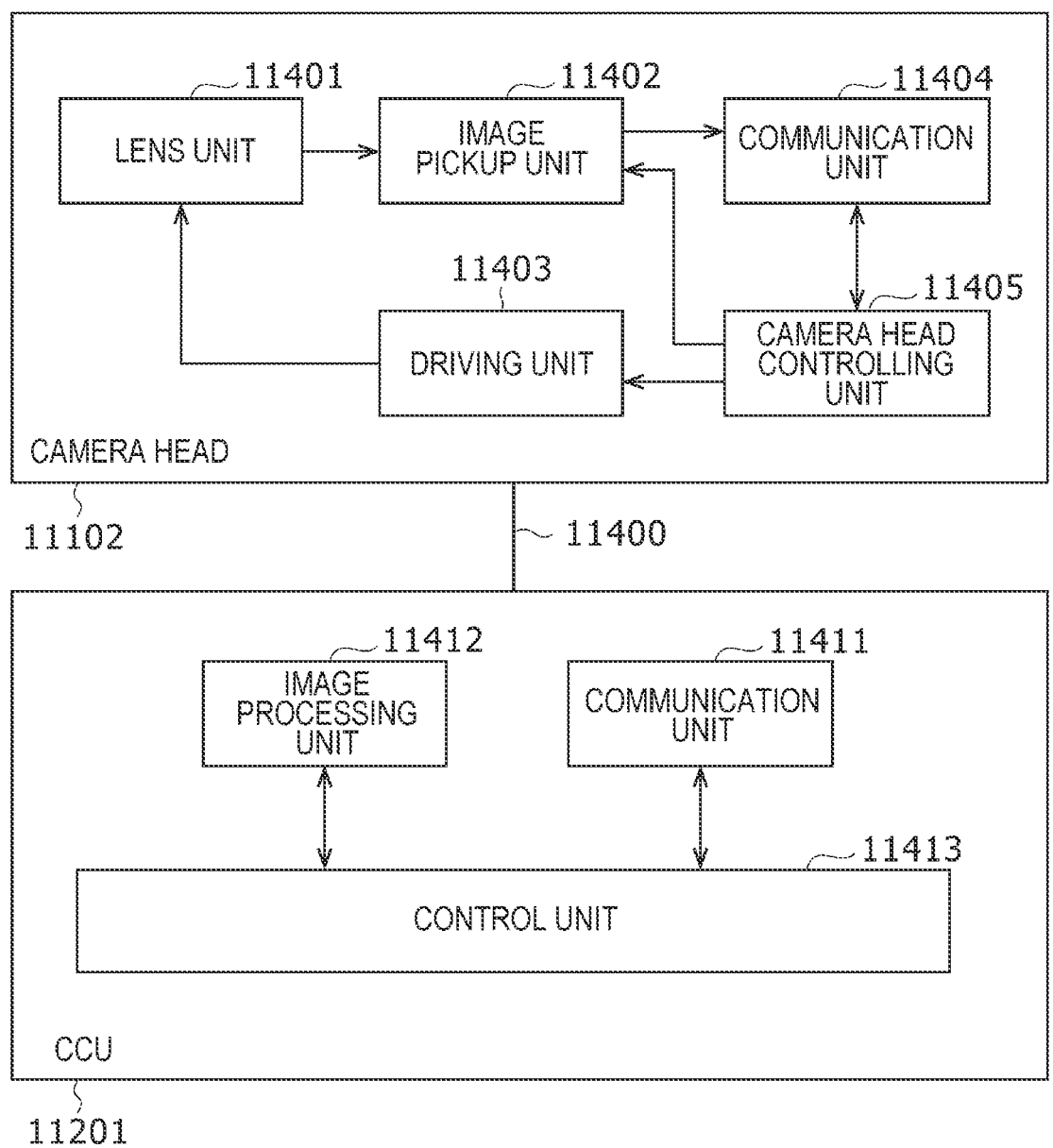
FIG. 15 is a block diagram depicting one example of a functional configuration of a camera head and a camera control unit (CCU).

FIG. 15 is a block diagram depicting an example of a functional configuration of the camera head 11102 and the CCU 11201 depicted in FIG. 14.

The camera head 11102 includes a lens unit 11401, an image pickup unit 11402, a driving unit 11403, a communication unit 11404 and a camera head controlling unit 11405. The CCU 11201 includes a communication unit 11411, an image processing unit 11412 and a control unit 11413. The camera head 11102 and the CCU 11201 are connected for communication to each other by a transmission cable 11400.

The lens unit 11401 is an optical system, provided at a connecting location to the lens barrel 11101. Observation light taken in from a distal end of the lens barrel 11101 is guided to the camera head 11102 and introduced into the lens unit 11401. The lens unit 11401 includes a combination of a plurality of lenses including a zoom lens and a focusing lens.

The number of image pickup elements which is included by the image pickup unit 11402 may be one (single-plate type) or a plural number (multi-plate type). Where the image pickup unit 11402 is configured as that of the multi-plate type, for example, image signals corresponding to respective R, G and B are generated by the image pickup elements, and the image signals may be synthesized to obtain a color image. The image pickup unit 11402 may also be configured so as to have a pair of image pickup elements for acquiring respective image signals for the right eye and the left eye ready for three dimensional (3D) display. If 3D display is performed, then the depth of a living body tissue in a surgical region can be comprehended more accurately by the surgeon 11131. It is to be noted that, where the image pickup unit 11402 is configured as that of stereoscopic type, a plurality of systems of lens units 11401 are provided corresponding to the individual image pickup elements.

Furthermore, the image pickup unit 11402 may not necessarily be provided on the camera head 11102. For example, the image pickup unit 11402 may be provided immediately behind the objective lens in the inside of the lens barrel 11101.

The driving unit 11403 includes an actuator and moves the zoom lens and the focusing lens of the lens unit 11401 by a predetermined distance along an optical axis under the control of the camera head controlling unit 11405. Consequently, the magnification and the focal point of a picked up image by the image pickup unit 11402 can be adjusted suitably.

The communication unit 11404 includes a communication apparatus for transmitting and receiving various kinds of information to and from the CCU 11201. The communication unit 11404 transmits an image signal acquired from the image pickup unit 11402 as RAW data to the CCU 11201 through the transmission cable 11400.

In addition, the communication unit 11404 receives a control signal for controlling driving of the camera head 11102 from the CCU 11201 and supplies the control signal to the camera head controlling unit 11405. The control signal includes information relating to image pickup conditions such as, for example, information that a frame rate of a picked up image is designated, information that an exposure value upon image picking up is designated and/or information that a magnification and a focal point of a picked up image are designated.

It is to be noted that the image pickup conditions such as the frame rate, exposure value, magnification or focal point may be designated by the user or may be set automatically by the control unit 11413 of the CCU 11201 on the basis of an acquired image signal. In the latter case, an auto exposure (AE) function, an auto focus (AF) function and an auto white balance (AWB) function are incorporated in the endoscope 11100.

The camera head controlling unit 11405 controls driving of the camera head 11102 on the basis of a control signal from the CCU 11201 received through the communication unit 11404.

The communication unit 11411 includes a communication apparatus for transmitting and receiving various kinds of information to and from the camera head 11102. The communication unit 11411 receives an image signal transmitted thereto from the camera head 11102 through the transmission cable 11400.

Furthermore, the communication unit 11411 transmits a control signal for controlling driving of the camera head 11102 to the camera head 11102. The image signal and the control signal can be transmitted by electrical communication, optical communication or the like.

The image processing unit 11412 performs various image processes for an image signal in the form of RAW data transmitted thereto from the camera head 11102.

The control unit 11413 performs various kinds of control relating to image picking up of a surgical region or the like by the endoscope 11100 and display of a picked up image obtained by image picking up of the surgical region or the like. For example, the control unit 11413 creates a control signal for controlling driving of the camera head 11102.

Furthermore, the control unit 11413 controls, on the basis of an image signal for which image processes have been performed by the image processing unit 11412, the display apparatus 11202 to display a picked up image in which the surgical region or the like is imaged. Thereupon, the control unit 11413 may recognize various objects in the picked up image using various image recognition technologies. For example, the control unit 11413 can recognize a surgical tool such as forceps, a particular living body region, bleeding, mist when the energy device 11112 is used and so forth by detecting the shape, color and so forth of edges of objects included in a picked up image. The control unit 11413 may cause, when it controls the display apparatus 11202 to display a picked up image, various kinds of surgery supporting information to be displayed in an overlapping manner with an image of the surgical region using a result of the recognition. Where surgery supporting information is displayed in an overlapping manner and presented to the surgeon 11131, the burden on the surgeon 11131 can be reduced and the surgeon 11131 can proceed with the surgery with certainty.

The transmission cable 11400 which connects the camera head 11102 and the CCU 11201 to each other is an electric signal cable ready for communication of an electric signal, an optical fiber ready for optical communication or a composite cable ready for both of electrical and optical communications.

Here, while, in the example depicted, communication is performed by wired communication using the transmission cable 11400, the communication between the camera head 11102 and the CCU 11201 may be performed by wireless communication.

Hereinbefore, one example of the endoscopic surgery system to which the technology according to the present disclosure is described. The technology according to the present disclosure can be applied to the camera head 11102, the image pickup unit 11402, and the like among the above-described components. The technology according to the present disclosure is applied to the image pickup unit 11402, and as in the above description, it is thereby made possible to inhibit an increase in a circuit area whereas high-speed reading is enabled.

Note that although herein, as one example, the endoscopic surgery system is described, besides, the technology according to the present disclosure may be applied to, for example, a microscopic surgery system or the like.

The above-described embodiment may have the below-described forms.

(1)

A solid-state imaging device including:
- a pixel array that photoelectrically converts received light and contains pixels arranged in a two-dimensionally arrayed manner, the pixels outputting analog signals;
- a conversion part that converts the analog signals being outputted from the pixels to digital data;
- a coding part that generates one sign bit or a plurality of sign bits as to the digital data;
- a storage part that stores the digital data and the sign bit or sign bits;
- a decoding part that decodes the sign bit or sign bits as to the digital data being stored in the storage part;
- a determination part that determines, on the basis of the decoded sign bit or sign bits, whether or not an error in writing or reading of the digital data in or from the storage part has occurred; and
- a signal processing part that processes the digital data being read from the storage part on the basis of output of the determination part.

(2)

The solid-state imaging device described in (1), in which the sign bit or sign bits is or are an error correction code or error correction codes.

(3)

The solid-state imaging device described in (2), in which the determination part further determines whether or not, in writing or reading in or from the storage part, an error is correctable.

(4)

The solid-state imaging device described in (3), in which in a case where an error has occurred and the determination part determines that the error is correctable, the signal processing part executes error correction on the basis of the sign bit or sign bits.

(5)

The solid-state imaging device described in (3) or (4), in which in a case where an error has occurred and the determination part determines that the error is not correctable, the signal processing part executes detection of a defect in the storage part or the pixels.

(6)

The solid-state imaging device described in any one of (3) to (5), in which in a case where the error has occurred and the determination part determines that the error is not correctable, the signal processing part executes correction of digital data in which the error has been detected.

(7)

The solid-state imaging device described in any one of (3) to (6), in which the determination part provides error information for the digital data and transmits the digital data to the signal processing part.

(8)

The solid-state imaging device described in (7), in which the error information includes information which determines whether or not an error has occurred.

(9)

The solid-state imaging device described in (7), in which the error information includes information which determines whether or not an error is correctable.

(10)

The solid-state imaging device described in any one of (7) to (9), in which in a case where an image of a plurality of frames is acquired, between the frames of the digital data as to the image, the determination part provides the error information for the digital data and transmits the digital data to the signal processing part.

(11)

The solid-state imaging device described in any one of (7) to (10), in which the determination part provides the error information for each packet constituting the digital data and transmits the digital data to the signal processing part.

(12)

The solid-state imaging device described in any one of (7) to (11), in which the determination part provides the error information for each of pixel values based on one of or a plurality of the pixels constituting the digital data and transmits the digital data to the signal processing part.

(13)

The solid-state imaging device described in any one of (1) to (12), in which in a case where the decoding part decodes the sign bit or sign bits and detects an error which is correctable, the decoding part corrects the error in the digital data.

(14)

The solid-state imaging device described in any one of (1) to (13), further including:
- a first substrate in which at least the pixel array is located; and
- a second substrate in which at least the storage part is located.

(15)

The solid-state imaging device described in (14), in which the second substrate further includes the conversion part, the coding part, the decoding part, and the determination part.

(16)

The solid-state imaging device described in (15), in which the second substrate further includes the signal processing part.

(17)

The solid-state imaging device described in any one of (14) to (16), in which the first substrate and the second substrate are formed in a layered manner.

(18)

The solid-state imaging device described in (14) or (15), further including a third substrate in which at least the signal processing part is located.

(19)

The solid-state imaging device described in (18), in which the first substrate, the second substrate, and the third substrate are formed in a layered manner.

(20)

The solid-state imaging device described in (17) or (19), in which at least two of the substrates may be layered by a Chip on Chip (CoC) method.

(21)

The solid-state imaging device described in (17) or (19), in which at least two of the substrates may be layered by a Chip on Wafer (CoW) method.

(22)

The solid-state imaging device described in (17) or (19), in which at least two of the substrates may be layered by a Wafer on Wafer (WoW) method.

Aspects of the present disclosure are not limited to the above-described embodiments, include various modifications at which the present disclosure can arrive, and effects of the present disclosure are not limited to effects in the above-described contents. Constituent components in the embodiments may be appropriately combined to be applied. In other words, various addition, modification, and partial deletion, which are derived from the contents defined in the appended claims and its equivalents, can be made without departing from the conceptual spirit and scope of the present disclosure.

REFERENCE SIGNS LIST

1 Solid-state imaging device
100 Optical system
102 Pixel array
104 Analog circuit
106 Coding part
108 Storage part
110 Decoding part
112 Determination part
114 Signal processing part
20, 22, 24 (Layered) Substrate
200 First substrate
202 Second substrate
204 Third substrate

The invention claimed is:

1. A solid-state imaging device, comprising:
a pixel array configured to photoelectrically convert received light, wherein
the pixel array includes a plurality of pixels arranged in a two-dimensionally arrayed manner, and
the plurality of pixels is configured to output analog signals;
a conversion part configured to convert the analog signals output from the plurality of pixels to digital data;
a coding part configured to generate at least one sign bit that corresponds to the digital data;
a storage part configured to store the digital data and the at least one sign bit;
a decoding part configured to decode the at least one sign bit that corresponds to the digital data stored in the storage part;
a determination part configured to:
determine, based on the decoded at least one sign bit, whether an error in a writing operation or a reading operation of the digital data in or from the storage part has occurred; and
determine whether the error in the writing operation or the reading operation in or from the storage part is correctable; and
a signal processing part configured to:
process the digital data read from the storage part based on an output of the determination part; and
detect a defect in the storage part or the plurality of pixels of the pixel array based on an occurrence of the error and a determination that the error is not correctable.

2. The solid-state imaging device according to claim 1, wherein
the at least one sign bit is an error correction code.

3. The solid-state imaging device according to claim 1, wherein
in a case where the error has occurred and a determination that the error is correctable, the signal processing part is further configured to execute error correction based on a basis of the at least one sign bit.

4. The solid-state imaging device according to claim 1, wherein
in a case where the error has occurred and the determination that the error is not correctable, the signal processing part is further configured to execute correction of the digital data in which the error has been detected.

5. The solid-state imaging device according to claim 1, wherein the determination part is further configured to:
provide error information for the digital data; and
transmit the digital data to the signal processing part.

6. The solid-state imaging device according to claim 5, wherein
the error information includes information which determines whether the error has occurred.

7. The solid-state imaging device according to claim 5, wherein
the error information includes information which determines whether the error is correctable.

8. The solid-state imaging device according to claim 5, wherein
in a case where an image of a plurality of frames is acquired, the determination part is further configured to:
provide the error information for the digital data that corresponds to the image, wherein the error information is provided between the plurality of frames; and
transmit the digital data to the signal processing part.

9. The solid-state imaging device according to claim 5, wherein the determination part is further configured to:
   provide the error information for each packet that constitutes the digital data; and
   transmit the digital data to the signal processing part.

10. The solid-state imaging device according to claim 5, wherein the determination part is further configured to:
    provide the error information for each of pixel values based on at least one pixel of the plurality of pixels that constitutes the digital data; and
    transmit the digital data to the signal processing part.

11. The solid-state imaging device according to claim 1, wherein the decoding part is configured to:
    decode the at least one sign bit;
    detect the error which is correctable; and
    correct the error in the digital data based on the decoded at least one sign and the detected error which is correctable.

12. The solid-state imaging device according to claim 1, further comprising:
    a first substrate that includes at least the pixel array; and
    a second substrate that includes at least the storage part.

13. The solid-state imaging device according to claim 12, wherein
    the second substrate further includes the conversion part, the coding part, the decoding part, and the determination part.

14. The solid-state imaging device according to claim 13, wherein
    the second substrate further includes the signal processing part.

15. The solid-state imaging device according to claim 12, wherein
    the first substrate and the second substrate are in a layered manner.

16. The solid-state imaging device according to claim 12, further comprising
    a third substrate that includes at least the signal processing part.

17. The solid-state imaging device according to claim 16, wherein
    the first substrate, the second substrate, and the third substrate are in a layered manner.

\* \* \* \* \*